(12) United States Patent
Lin et al.

(10) Patent No.: US 11,047,304 B2
(45) Date of Patent: Jun. 29, 2021

(54) ACOUSTIC CORES WITH SOUND-ATTENUATING PROTUBERANCES

(71) Applicant: General Electric Company, Schenectady, NY (US)

(72) Inventors: Wendy Wenling Lin, Montgomery, OH (US); Shanmugam Murugappan, Mason, OH (US); Robert William Davidoff, Pittsburgh, PA (US); Graham Frank Howarth, Middletown, DE (US); Andrew Michael Roach, Aberdeen, MD (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 16/058,171

(22) Filed: Aug. 8, 2018

(65) Prior Publication Data

US 2020/0049068 A1    Feb. 13, 2020

(51) Int. Cl.
*F02C 7/045* (2006.01)
*B33Y 80/00* (2015.01)
(Continued)

(52) U.S. Cl.
CPC .............. *F02C 7/045* (2013.01); *B22F 10/10* (2021.01); *B23P 15/008* (2013.01); *B28B 1/001* (2013.01);
(Continued)

(58) Field of Classification Search
CPC .............. F02C 7/045; B32B 2307/102; Y10T 428/24165; Y10T 29/49323; F05D 2240/14
See application file for complete search history.

(56) References Cited

U.S. PATENT DOCUMENTS

| 3,035,657 A | 5/1962 | Lemon |
| 3,070,198 A | 12/1962 | Haskell |

(Continued)

FOREIGN PATENT DOCUMENTS

| EP | 0405581 B1 | 10/1993 |
| EP | 0839101 B1 | 5/1998 |

(Continued)

OTHER PUBLICATIONS

Bertolucci, An Experimental Investigation of the Grazing Flow Impedance Duct at the University of Florida for Acoustic Liner Applications, University of Florida Dissertation, 2012, 217 Pages.

(Continued)

*Primary Examiner* — Jason L Vaughan
(74) *Attorney, Agent, or Firm* — Dority & Manning, P.A.

(57) ABSTRACT

An acoustic core has a plurality of cell walls formed of an additive-manufacturing material and a resonant space defined by the plurality of cell walls. At least some of the resonant cells have a multitude of sound-attenuating protuberances formed of the additive-manufacturing material of the cell walls protruding into the resonant space with a random or semi-random orientation and/or size. The sound-attenuating protuberances may be formed by orienting an additive-manufacturing tool with respect to a toolpath to form a contour of a workpart, in which the toolpath includes a plurality of overlapping toolpath passes configured so as to intentionally introduce an amount of additive-manufacturing material to the workpart that exceeds a domain occupied by the contour. As the amount of additive-manufacturing material intentionally introduced exceeds the domain occupied by the contour, a portion of the additive-manufacturing material may incidentally form the plurality of sound-attenuating protuberances.

15 Claims, 11 Drawing Sheets

(51) Int. Cl.
*B33Y 10/00* (2015.01)
*B29C 64/10* (2017.01)
*B28B 1/00* (2006.01)
*B23P 15/00* (2006.01)
*B22F 10/10* (2021.01)
*B29L 31/00* (2006.01)

(52) U.S. Cl.
CPC .............. *B29C 64/10* (2017.08); *B33Y 10/00* (2014.12); *B33Y 80/00* (2014.12); *B29K 2995/0002* (2013.01); *B29L 2031/7504* (2013.01); *F05D 2220/323* (2013.01); *F05D 2230/31* (2013.01); *F05D 2230/50* (2013.01); *F05D 2240/14* (2013.01); *F05D 2260/96* (2013.01); *Y10T 29/49323* (2015.01)

(56) References Cited

U.S. PATENT DOCUMENTS

| | | |
|---|---|---|
| 3,232,371 A | 2/1966 | Reichert et al. |
| 3,734,234 A | 5/1973 | Wirt |
| 3,803,754 A | 4/1974 | Fischer |
| 3,819,009 A | 6/1974 | Motsinger |
| 3,831,710 A | 8/1974 | Wirt |
| 3,850,261 A | 11/1974 | Hehmann et al. |
| 3,905,443 A | 9/1975 | Sieuzac |
| 3,913,702 A | 10/1975 | Wirt et al. |
| 4,001,473 A | 1/1977 | Cook |
| 4,035,535 A | 7/1977 | Taylor |
| 4,074,496 A | 2/1978 | Fischer |
| 4,141,433 A | 2/1979 | Warnaka |
| 4,243,117 A | 1/1981 | Warnaka |
| 4,265,955 A | 5/1981 | Harp et al. |
| 4,291,080 A | 9/1981 | Ely et al. |
| 4,298,090 A | 11/1981 | Chapman |
| 4,339,018 A | 7/1982 | Warnaka |
| 4,551,110 A | 11/1985 | Selvage et al. |
| 4,676,762 A | 6/1987 | Ballard |
| 5,353,502 A | 10/1994 | Hattori et al. |
| 5,445,861 A | 8/1995 | Newton et al. |
| 5,480,729 A | 1/1996 | Hattori et al. |
| 5,690,035 A | 11/1997 | Hatayama et al. |
| 5,959,264 A | 9/1999 | Brück et al. |
| 6,182,787 B1 | 2/2001 | Kraft et al. |
| 6,200,664 B1 | 3/2001 | Figge et al. |
| 6,203,656 B1 | 3/2001 | Syed |
| 6,206,136 B1 | 3/2001 | Swindlehurst et al. |
| 6,209,679 B1 | 4/2001 | Hogeboom et al. |
| 6,256,959 B1 | 7/2001 | Palmersten |
| 6,630,093 B1 | 10/2003 | Jones |
| 6,772,857 B2 | 8/2004 | Porte et al. |
| 6,840,349 B2 | 1/2005 | Andre et al. |
| 6,871,725 B2 | 3/2005 | Johnson |
| 6,884,486 B2 | 4/2005 | Estrin et al. |
| 6,913,570 B2 | 7/2005 | Kehrle |
| 7,410,455 B2 | 8/2008 | Akishev et al. |
| 7,484,592 B2 | 2/2009 | Porte et al. |
| 7,510,052 B2 | 3/2009 | Ayle |
| 7,866,377 B2 | 1/2011 | Slaughter |
| 7,906,205 B2 | 3/2011 | Meres |
| 7,921,966 B2 | 4/2011 | Chiou et al. |
| 7,935,205 B2 | 5/2011 | Bogue et al. |
| 7,954,224 B2 | 6/2011 | Douglas |
| 7,963,362 B2 | 6/2011 | Lidoine |
| 7,971,684 B2 | 7/2011 | Gantie et al. |
| 8,016,230 B2 | 9/2011 | Fogarty et al. |
| 8,047,326 B2 | 11/2011 | Valleroy et al. |
| 8,464,831 B2 | 6/2013 | Olander Burak et al. |
| 8,579,076 B2 | 11/2013 | Ayle et al. |
| 8,689,936 B2 | 4/2014 | Richter |
| 8,784,592 B2 | 7/2014 | Kolax et al. |
| 8,789,652 B2 | 7/2014 | Swallowe et al. |
| 8,905,189 B2 | 12/2014 | Ayle et al. |
| 8,985,513 B2 | 3/2015 | Dean et al. |
| 8,997,923 B2 | 4/2015 | Ichihashi |
| 9,175,474 B2 | 11/2015 | May et al. |
| 9,222,229 B1 | 12/2015 | Chang et al. |
| 9,284,726 B2 | 3/2016 | Tien |
| 9,290,274 B2 | 3/2016 | Roach et al. |
| 9,296,044 B2 | 3/2016 | Douglas |
| 9,302,869 B2 | 4/2016 | Kendrick et al. |
| 9,365,022 B2 | 6/2016 | Kendrick et al. |
| 9,378,721 B2 | 6/2016 | Zalewski et al. |
| 9,514,734 B1 | 12/2016 | Jones et al. |
| 9,546,602 B2 | 1/2017 | Julliard et al. |
| 9,607,600 B2 | 3/2017 | Swallowe et al. |
| 9,693,166 B2 | 6/2017 | Herrera et al. |
| 9,759,447 B1 | 9/2017 | Mathur |
| 9,909,471 B2 | 3/2018 | Mattia |
| 9,978,354 B2 | 5/2018 | Nampy |
| 10,032,445 B1 | 7/2018 | Linch et al. |
| 10,107,139 B1 | 10/2018 | Jones et al. |
| 10,174,675 B2 | 1/2019 | Martinez et al. |
| 2001/0048027 A1 | 12/2001 | Walsh |
| 2010/0307867 A1 | 12/2010 | Ogawa et al. |
| 2011/0100749 A1 | 5/2011 | Nonogi et al. |
| 2011/0244213 A1 | 10/2011 | Jones |
| 2013/0306402 A1 | 11/2013 | Todorovic |
| 2014/0133964 A1 | 5/2014 | Ayle |
| 2014/0251481 A1 | 9/2014 | Kroll et al. |
| 2014/0305529 A1 | 10/2014 | Kroll et al. |
| 2014/0341744 A1 | 11/2014 | Cazuc et al. |
| 2015/0027629 A1 | 1/2015 | Butler et al. |
| 2015/0044413 A1 | 2/2015 | Vauchel et al. |
| 2015/0064015 A1 | 3/2015 | Perez |
| 2015/0110603 A1 | 4/2015 | Biset et al. |
| 2015/0292413 A1 | 10/2015 | Soria et al. |
| 2015/0373470 A1 | 12/2015 | Herrera et al. |
| 2016/0010863 A1 | 1/2016 | Ott et al. |
| 2016/0017775 A1 | 1/2016 | Mattia |
| 2016/0017810 A1 | 1/2016 | Lord et al. |
| 2016/0067938 A1 | 3/2016 | Goodrich |
| 2016/0109130 A1 | 4/2016 | Stastny et al. |
| 2016/0123160 A1 | 5/2016 | Strock et al. |
| 2016/0319690 A1 | 11/2016 | Lin et al. |
| 2017/0043550 A1 | 2/2017 | Coic et al. |
| 2017/0045059 A1 | 2/2017 | Care et al. |
| 2017/0072638 A1 | 3/2017 | Hayes et al. |
| 2017/0191414 A1 | 7/2017 | Martinez et al. |
| 2018/0016987 A1 | 1/2018 | Howarth et al. |
| 2018/0162542 A1 | 6/2018 | Vandemark et al. |
| 2018/0174568 A1 | 6/2018 | Porte et al. |
| 2018/0218723 A1 | 8/2018 | Lin et al. |
| 2018/0245516 A1 | 8/2018 | Howarth et al. |
| 2019/0080679 A1 | 3/2019 | Alstad |
| 2019/0270504 A1 | 9/2019 | Cedar et al. |

FOREIGN PATENT DOCUMENTS

| | | |
|---|---|---|
| EP | 2960023 A1 | 12/2015 |
| EP | 3232434 A1 | 10/2017 |
| JP | S58-156052 U | 10/1983 |
| JP | H03-33897 A | 2/1991 |
| WO | WO2016/0133501 A1 | 8/2016 |

OTHER PUBLICATIONS

Bielak et al., Advanced Nacelle Acoustic Lining Concepts Development, NASA, CR-2002-211672, Aug. 2002, Total pp. 203.

Dai et al., Acoustic of a Perforated Liner with Grazing Flow: Floquet-Bloch Periodical Approach Versus Impedance Continuous Approach, Research Gate, The Journal of the Acoustical Society of America, Sep. 2016, 10 pages. http://dx.doi.org/10.1121/1.4962490.

Dannemann et al., Experimental Study of Advanced Helmholtz Resonator Liners with Increased Acoustic Performance by Utilising Material Damping Effects, Applied Sciences, 2018, 18 Pages.

Jones, et al., Evaluation of Parallel-Element, Variable-Impedance, Broadband Acoustic Liner Concepts, AIAA-2012-2194, Jun. 2012, 17 Pages.

Kraft et al., Acoustic Treatment Design Scaling Methods, vol. 2: Advanced Treatment Impedance Models for High Frequency Ranges, NASA, CR-1999-209120, vol. 2, 1999, Total pp. 98.

(56) References Cited

OTHER PUBLICATIONS

Lawn, Acoustic Pressure Losses in Woven Screen Regenerators, ResearchGate, Applied Acoustics, vol. 77, Mar. 2014, pp. 42-48.
Malmary et al., Acoustic Impedance Measurement with Grazing Flow, AIAA-2001-2193, 7th AIAA/CEAS Aeroacoustics Conference, May 2001, Netherlands, 9 Pages.
Martinson, Mechanical Design for 3D Printing, Nov. 2012, 15 pages. http://eikimartinson.com/engineering/3dparts/#dovetail.
Motsinger et al., Design and Performance of Duct Acoustic Treatment, NASA, N92-14783, 1991, pp. 165-206. https://ntrs.nasa.gov/archive/nasa/casi.ntrs.nasa.gov/19920005565.pdf.
Nark et al., Acoustic Liner Overview, Acoustics Technical Working Group Meeting, Nasa Langley Research Center, Cleveland, Oct. 22-23, 2019, pp. 1-25.
Primus et al., ONERA-NASA Cooperative Effort on Liner Impedance Education, AIAA 2013-2273, Research Gate, 19th AIAA/CEAS Aeroacoustics Conference, May 2013, Germany, 16 Pages.
Schiller et al., Experimental Evaluation of Acoustic Engine Liner Models Developed with Comsol Multiphysics, 23rd American Institute of Aeronautics and Astronautics, DEAS Aeroacoustics Conference, NASA, 2017, 25 Pages. https://ntrs.nasa.gov/archive/nasa/casi.ntrs.nasa.gov/20170005768.pdf.
Sellen et al., Noise Reduction in a Flow Duct: Implementation of a Hybrid Passive/Active Solution, Science Direct, Journal of Sound and Vibration, vol. 297, 2006, pp. 492-511.
Soderman et al., Design and Development of a Deep Acoustic Lining for the 40-by 80 Foot Wind Tunnel Test Station, NASA TP-2002-211850, Nov. 2002, 61 Pages.
Syed et al., Paper No. 07ATC-43 Development of the Acousti-Cap TM Technology Double-Layer Acoustic Liners in Aircraft Engine Nacelles, Research Gate, 2007 SAE International, 23 Pages.
Tam et al., Experimental Validation of Numerical Simulations for an Acoustic Liner in Grazing Flow, 30 Pages. https://ntrs.nasa.gov/archive/nasa/casintrs.nasa.gov/20130014086.pdf.
Tam et al., Numerical Simulation of a Slit Resonator in a Grazing Flow, AIAA 2006-799, 44th AIAA Aerospace Meeting and Exhibit, Nevada, 2006, 20 Pages.
Zhang, Numerical Simulation of Two-Dimensional Acoustic Liners with High Speed Grazing Flow, MS Thesis, Urbana, Illinois, 2010, 90 Pages.
Zhou, Acoustic Characterization of Orifices and Perforated Liners with Flow and High-Level Acoustic Excitation, DiVA Digitala Vetenskapliga Arkivet, KTH Royal Institute of Technology.
School of Engineering Sciences (SCI), Aeronautical and Vehicle Engineering, MWL Flow Acoustics, Doctoral Thesis, Stockholm, p. vi, 2015 , 70 Pages. http://www.diva-portal.org/smash/record.jsf?pid=diva2:813073.
U.S. Appl. No. 15/421,935, filed Feb. 1, 2017.
Jones, et al., Evaluation of Parallel-Element, Variable-Impedance, Broadband Acoustic Linear Concepts, AIAA-2012-2914, Jun. 2012, 17 Pages.

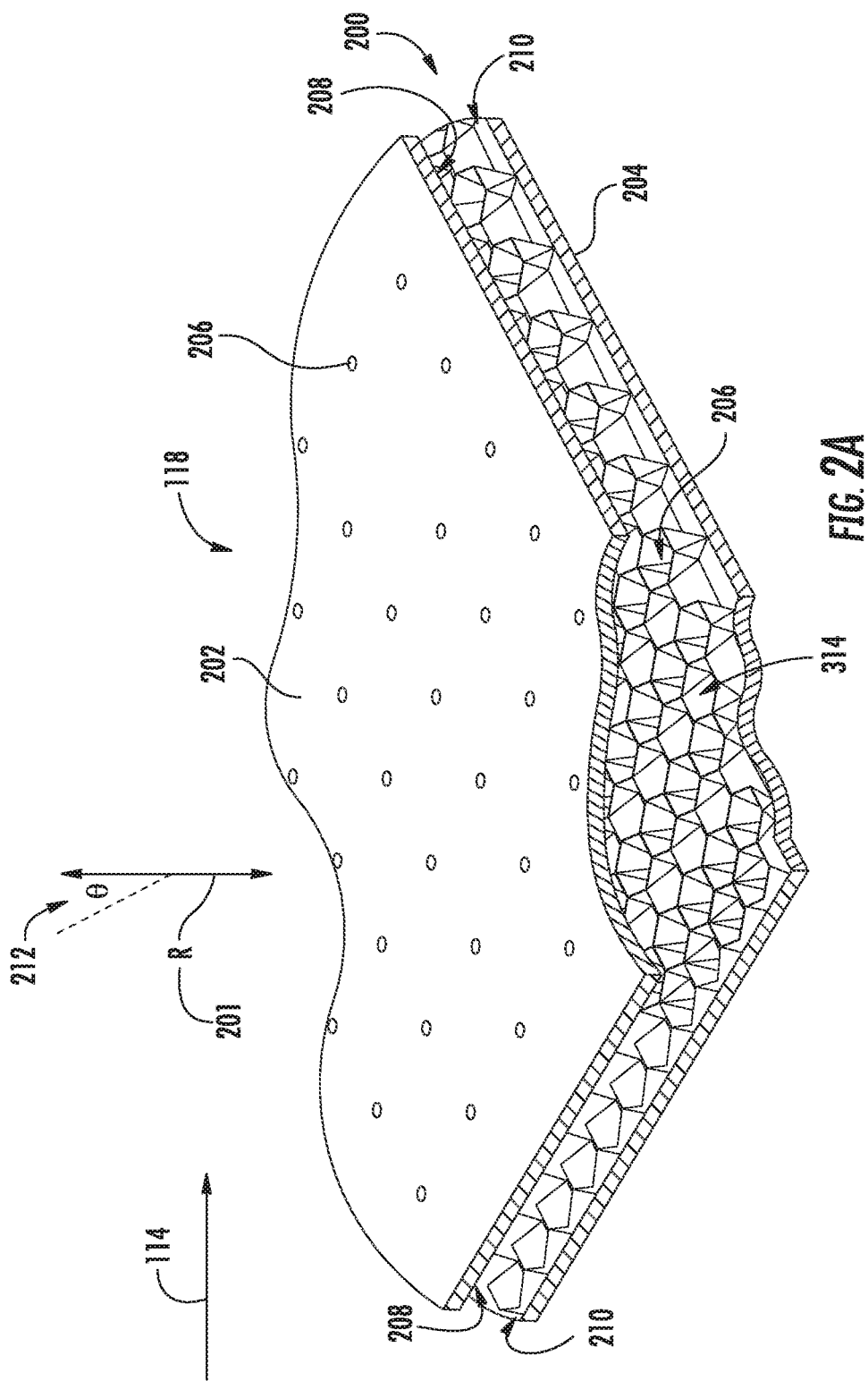

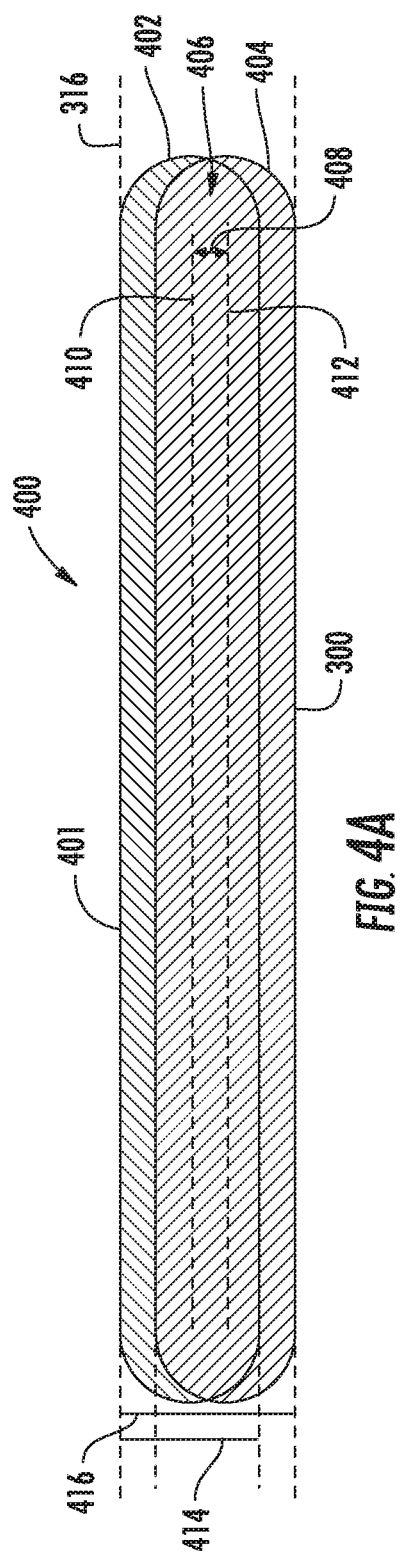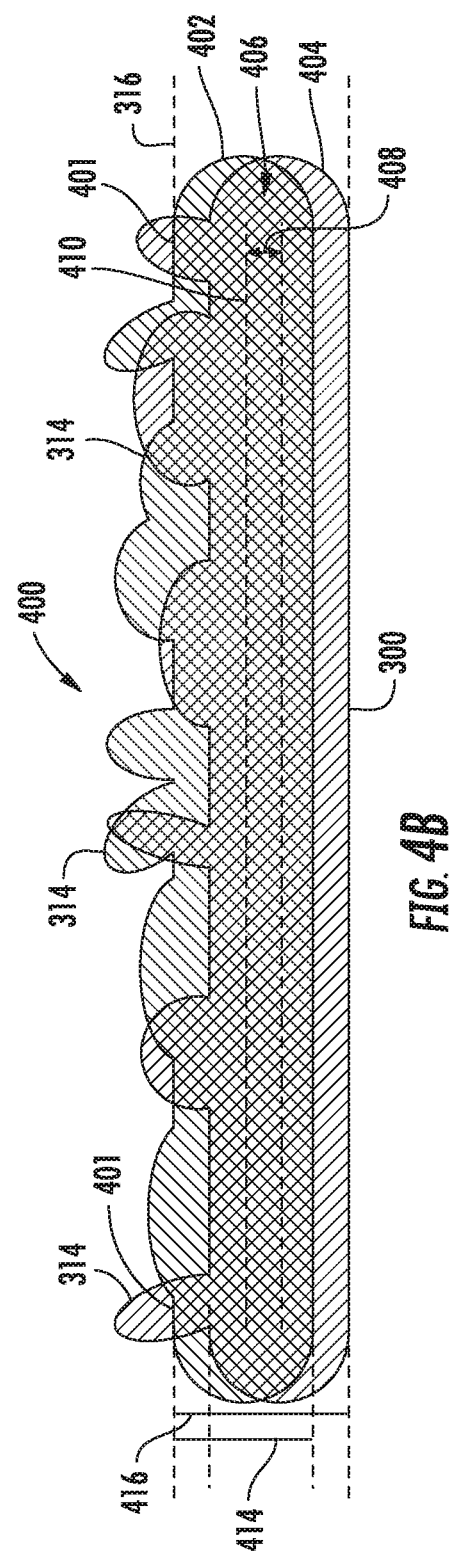
FIG. 4A
FIG. 4B

ACOUSTIC CORES WITH SOUND-ATTENUATING PROTUBERANCES

FEDERALLY SPONSORED RESEARCH

This invention was made with government support under contract number DTFAWA-15-A-80013 with the United States Department of Transportation Federal Aviation Administration (FAA). The government may have certain rights in the invention.

FIELD

The present disclosure pertains to acoustic cores that have sound attenuating protuberances and acoustic liners made therefrom, as well as methods of making such acoustic cores and liners.

BACKGROUND

Acoustic liners may be used to dampen or attenuate sound waves. For example, acoustic liners are commonly used to dampen or attenuate noise from turbomachines such as turbofan engines. Typical acoustic liners include an acoustic core positioned between a perforated face sheet and a substantially imperforate back sheet. The perforated face sheet allows sound waves to enter the acoustic core. The acoustic core includes a plurality of resonant cells intended to dampen or attenuate sound waves. However, existing acoustic cores may have varying degrees of acoustic absorption across a spectrum of frequencies. In fact, some acoustic cores may not exhibit satisfactory acoustic absorption with respect to certain absorption frequencies.

Accordingly, there exists a need for improved acoustic cores and acoustic liners having such improved acoustic cores. Additionally, there exists a need for improved methods of forming acoustic cores with improved acoustic absorption properties and/or features.

BRIEF DESCRIPTION

Aspects and advantages will be set forth in part in the following description, or may be obvious from the description, or may be learned through practicing the presently disclosed subject matter.

In one aspect, the present disclosure embraces an acoustic core with resonant cells that have a multitude of sound-attenuating protuberances. An exemplary acoustic core includes an array of resonant cells. Each of the resonant cells in the exemplary acoustic core has a plurality of cell walls formed of an additive-manufacturing material and a resonant space defined by the plurality of cell walls. At least some of the resonant cells have a multitude of sound-attenuating protuberances formed of the additive-manufacturing material of the cell walls integrally protruding into the resonant space with a random or semi-random orientation and/or size.

In another aspect, the present disclosure embraces acoustic liners that include an acoustic core that has sound-attenuating protuberances. An exemplary acoustic liner may be included in a nacelle to dampen or attenuate sound waves from a turbomachine. For example, a turbomachine may include a turbine and a nacelle surrounding the turbine. The nacelle may define a fan duct having a duct wall, and one or more acoustic liners may be disposed annularly along the duct wall. At least one of the one or more acoustic liners may include an acoustic core that has sound-attenuating protuberances.

In yet another aspect, the present disclosure embraces methods of forming a workpart that has sound-attenuating protuberances. An exemplary workpart may include an acoustic core, such as for an acoustic liner. An exemplary method includes orienting an additive-manufacturing tool with respect to a toolpath to form a contour of a workpart. The toolpath may include a plurality of overlapping toolpath passes. The overlapping toolpath passes may be configured so as to intentionally introduce an amount of additive-manufacturing material to the workpart that exceeds a domain occupied by the contour. As the amount of additive-manufacturing material intentionally introduced exceeds the domain occupied by the contour, a portion of the additive-manufacturing material may incidentally form a plurality of sound-attenuating protuberances having a random or semi-random orientation and/or size. The formation of the sound-attenuating protuberances may be intentionally incidental to the formation of the workpart.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 2A shows an isometric partial cutaway view of a portion of an exemplary acoustic liner;

FIGS. 4A and 4B illustratively show exemplary toolpaths which may be used to additively manufacture a workpart such as an acoustic core with sound-attenuating protuberances;

Figure 1:
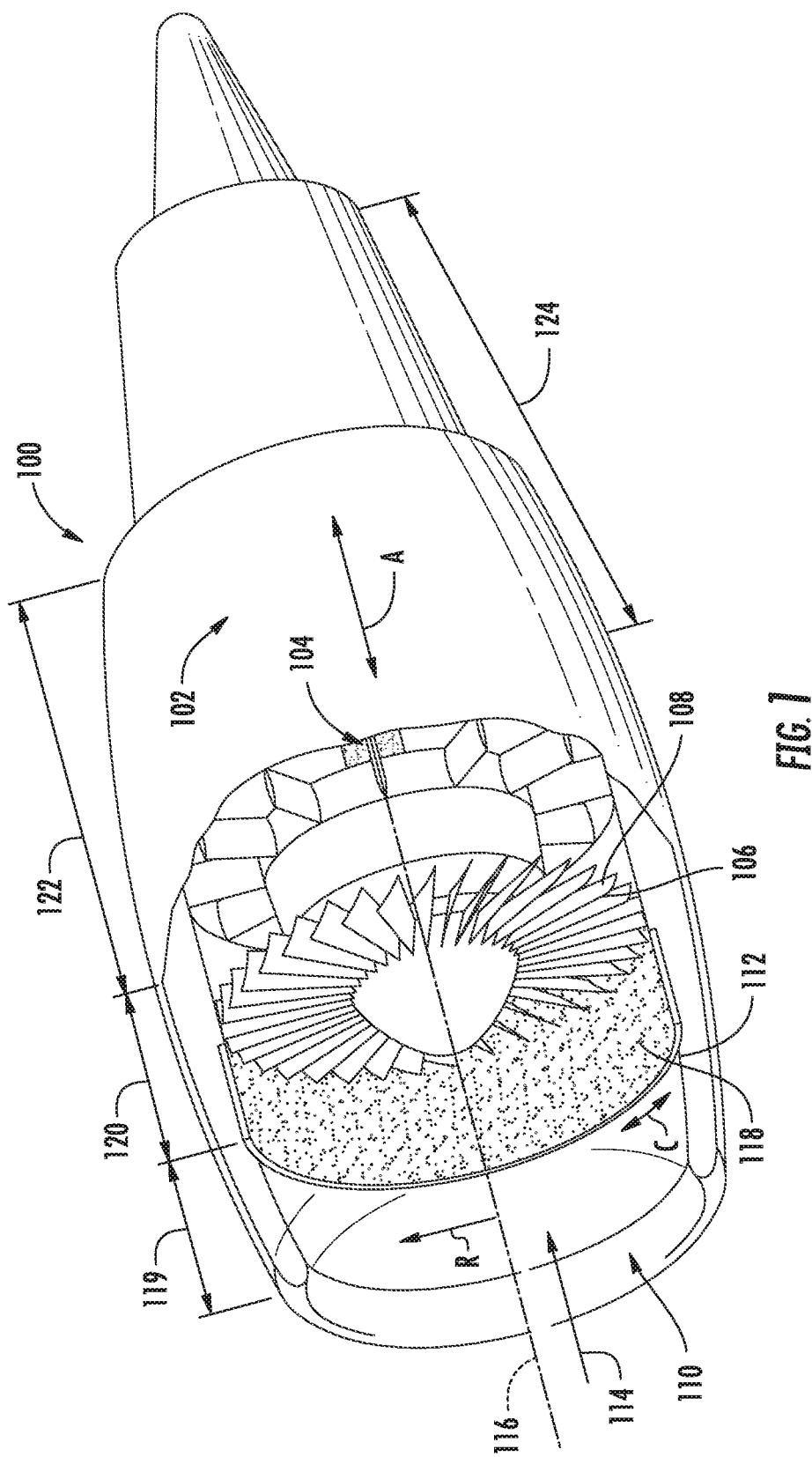
FIG. 1 shows a perspective partial cutaway view of a turbomachine that has an acoustic liner.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Acoustic liners for damping or attenuating sound waves are described herein. Acoustic liners may be used, for example, to dampen or attenuate noise generated by or emanating from various aspects or components of turbomachines, such as turbofan engines commonly used in aircraft, including commercial, military, and civilian aircraft. Acoustic liners may be used for damping and attenuating noise from a wide variety of turbomachines, including, turbojets, turbofans, turboprops, turboshafts, ramjets, rocket jets, pulse-jets, turbines, gas turbines, steam turbines, marine engines, and the like. More broadly, acoustic liners may be used to dampen or attenuate sound waves from any source that might be within the contemplation of those skilled in the art.

The presently discloses acoustic liners that have an acoustic core with sound-attenuating protuberances integrally formed with the cell walls of the acoustic core. Any one or a combination of additive-manufacturing technologies may be used to additively-manufacture a workpart such as an acoustic core with sound attenuating protuberances. The integral formation of the sound-attenuating protuberances may be intentionally incidental to the formation of the workpart using the additive-manufacturing technology. By intentionally incidental, it is meant that the multitude of sound-attenuating protuberances would not typically be formed integrally with the workpart when using the additive-manufacturing technology, but that intentional modifications to the additive-manufacturing technology as described herein causes the multitude of sound-attenuating protuberances to be incidentally formed as an intended integral feature of the workpart (e.g., the acoustic core).

The intentionally incidental nature of the sound-attenuating protuberances or the formation thereof may provide for a random or semi-random orientation and/or size of sound-attenuating protuberances over at least a portion of the acoustic core, such as at least a portion of the cell walls making up the resonant cells of the acoustic core. This random or semi-random orientation and/or size may not necessarily be achievable by other means, such as directly additively manufacturing each individual protuberance. For example, in some embodiments, at least a portion of the sound-attenuating protuberances may have one or more dimensions (e.g., height, width, and/or length) that are smaller than a corresponding minimum dimensional resolution provided for by the additive-manufacturing technology utilized to produce the acoustic core.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

As shown in FIG. 1, a turbofan engine 100 includes a housing or nacelle 102 surrounding a turbine 104 and/or a fan rotor 106, which includes a plurality of circumferentially spaced fan blades 108 powered by the turbine 104. An exemplary housing or nacelle 102 includes an inlet 110 and a duct having a duct wall 112 that directs airflow 114 downstream through a fan rotor 106, generally along a longitudinal axial centerline 116. In some embodiments, one or more acoustic liners provide a system for damping or attenuating sound waves. An exemplary system may include one or more acoustic liners 118 disposed annularly along the duct wall 112. The one or more acoustic liners 118 may have a position along the duct wall 112 located upstream from the fan blades 108. One or more acoustic liners may also be positioned downstream from the fan blades 108. For example, an acoustic liner may be positioned at or aft of an inner barrel 119 portion of the nacelle 102. Additionally or alternatively, one or more acoustic liners 118 may be positioned at or aft of a fan casing portion 120 and/or a transcowl portion 122 of a nacelle 102. In some embodiments, a turbofan engine may include a plurality of housings surrounding a turbine. In some embodiments, a plurality of housings may be configured and arranged annularly relative to one another. Each such housing may include an inner duct wall 112 and an outer duct wall 112. One or more acoustic liners may be positioned about an inner duct wall 112 and/or an outer duct wall 112 of any one or more of a plurality of housings. Additionally, one or more acoustic liners 118 may be positioned in proximity to non-rotating portions of the fan casing portion 120 or other components of the turbofan engine 100. These positions include ducts or casings within the turbofan engine 100 where an acoustic liner may be effective for noise suppression (e.g., damping or attenuation) at various frequency ranges. For example, one or more acoustic liners 118 may be positioned at a core cowl portion 124. Those skilled in the art will appreciate even further areas where acoustic liners may be positioned to dampen or attenuate noise generated by or emanating from various aspects of a turbofan engine.

In operation, a turbofan engine generates a tremendous amount of noise. To illustrate a typical source of turbofan engine noise, it will be appreciated that the fan rotor 106 rotates within the fan casing portion 120, producing discrete tonal noise predominately at a blade passage frequency (BPF) and multiples thereof. During take-off of the aircraft, the fan blades 108 reach transonic and supersonic rotational velocities, generating noise that propagates out of the fan duct into the surrounding environment. In exemplary embodiments, one or more acoustic liners 118 are configured and arranged to suppress noise resonating at the BPF and harmonics of the BPF. The one or more acoustic liners 118 or various portions thereof may be configured to dampen or attenuate sound waves and thereby reduce the sound at specific frequencies or across a range of frequencies. Some aspects of an acoustic liner 118 may be configured to reflect incident sound waves multiple times before the sound waves escape the acoustic liner 118. These multiple reflections may reduce the amplitude of the sound waves. Additionally, some aspects of an acoustic liner 118 may be configured to cause sound waves to become out-of-phase. When sound waves become out-of-phase, various portions of the sound waves tend to cancel one another, thereby reducing at least some of the energy in the sound waves. The acoustic liners 118 disclosed herein include acoustic cores with sound-attenuating protuberances, among other aspects and features, which may be configured to dampen or attenuate sound according to at least these modalities.

FIG. 2A shows an isometric partial cutaway view of a portion of an exemplary acoustic liner 118. This acoustic liner may be configured for use with the turbofan engine shown in FIG. 1 or for attenuating noise from any other source within the contemplation of those skilled in the art. In some embodiments, the acoustic liner 118 may be disposed proximate to airflow 114 (also shown in FIG. 1). The acoustic liner 118 may be secured within the turbofan engine 100 by a flange or other attachment with the duct wall 112 and/or the fan casing portion 120. The acoustic liner 118 includes an acoustic core 200 positioned between a perforated face sheet 202 and a substantially imperforate back sheet 204. The acoustic core is made up of hollow cellular structures or resonant cells, and at least some of the resonant cells include sound-attenuating protuberances on at least a portion of the cell surfaces as described herein.

The face sheet 202 includes a plurality of perforations 206 extending through a material of construction of the face sheet 202, and positioned and spaced in at least one of a repeating pattern and a random pattern. The perforations 206 allow sound waves to enter the cellular structure of the acoustic core. The face sheet 202 may be formed of a wire mesh or a woven or nonwoven fibrous material that has perforations applied thereto or that has porous characteristics as formed. The face sheet 202 and back sheet 204 form planes having a generally parallel orientation relative to one another.

The acoustic core 200 may be secured between the face sheet 202 and the back sheet 204 using an adhesive process. For example a thermal, sonic, or electric welding process may be used. Alternatively, an adhesive formulation such as a thermosetting or pressure sensitive adhesive or an adhesive tape may be used to secure the acoustic core in position. A thickness or height of the acoustic core 200 may be defined by a distance taken along an axis R 201 (also shown in FIG. 1) between an inside surface of the face sheet 202 and an inside surface of the back sheet 204. A top face 208 defines a first linear or curved surface of the acoustic core 200 and a bottom face 210 defines a second linear or curved surface of the acoustic core. The top face 208 resides adjacent to and oriented towards the inside surface of the face sheet 202, and the bottom face 210 resides adjacent to and oriented towards the inside surface of the back sheet 204. The axis R 201 represents a normal line relative to the normal surface corresponding to the top face and/or the bottom face. The axis R may be a radial or other axis as the context requires. In this exemplary embodiment, the terms "inner" and "outer" refer to the orientation of the respective layers in relation to the longitudinal axial centerline 116 shown in FIG. 1.

The face sheet 202, the back sheet 204, and the acoustic core 200 may together form an arcuate cylindrical acoustic liner 118 (see, e.g., FIG. 1), a portion of which is shown in FIG. 2A. A noise source (e.g., fan blades 108 of fan rotor 106) is thus positioned within the arcuate cylindrical acoustic liner 118. The porous face sheet 202 of the acoustic liner typically orientates towards the noise source, with the back sheet 204 typically being more distal from the noise source relative to the face sheet 202. In an alternative embodiment, the face sheet 202, the back sheet 204, and the acoustic core 200 may together form an acoustic liner 118 that has a substantially flat planar profile. For example, and without limitation, an enclosed volume such as a room or an engine casing may contain a noise source such as noisy machinery, and one or more walls or other aspects of such an enclosed volume may be lined with a substantially flat acoustic liner 118.

Figure 2B:
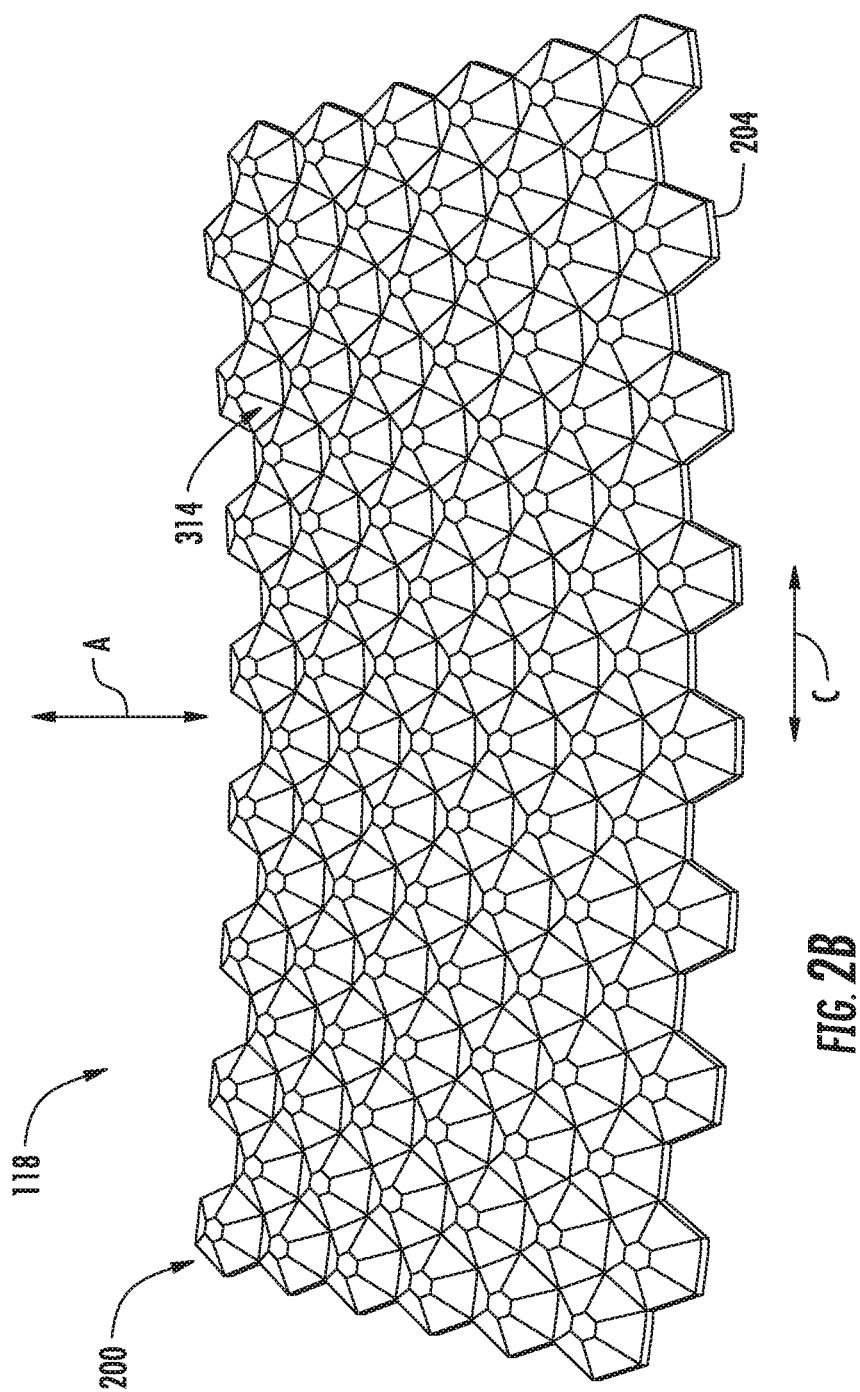
FIG. 2B shows an isometric perspective view of a portion of an exemplary acoustic liner with the face sheet removed to reveal an exemplary acoustic core.

In still other embodiments, the face sheet 202, the back sheet 204, and the acoustic core 200 may together form a complexly curved acoustic liner 118. For example, and without limitation, one or more complexly curved walls or other aspects of a nacelle or a noise source-containing room or space may be at least partially lined with a complexly curved acoustic liner 118. For example, FIG. 2B shows an exemplary curved acoustic liner. The curve may be configured to correspond to the contour of a mounting location, such as a location 112, 119, 120, 122 within a nacelle 102 of a turbofan engine 100. The face sheet 202 of the acoustic liner 118 has been omitted from FIG. 2B to further illustrate the acoustic core 200. The acoustic core 200 includes an array of resonant cells. The resonant cells may have any polyhedral structures or combination of structures, including parallel polyhedral cellular structures and/or oblique polyhedral cellular structures.

Figure 3A:
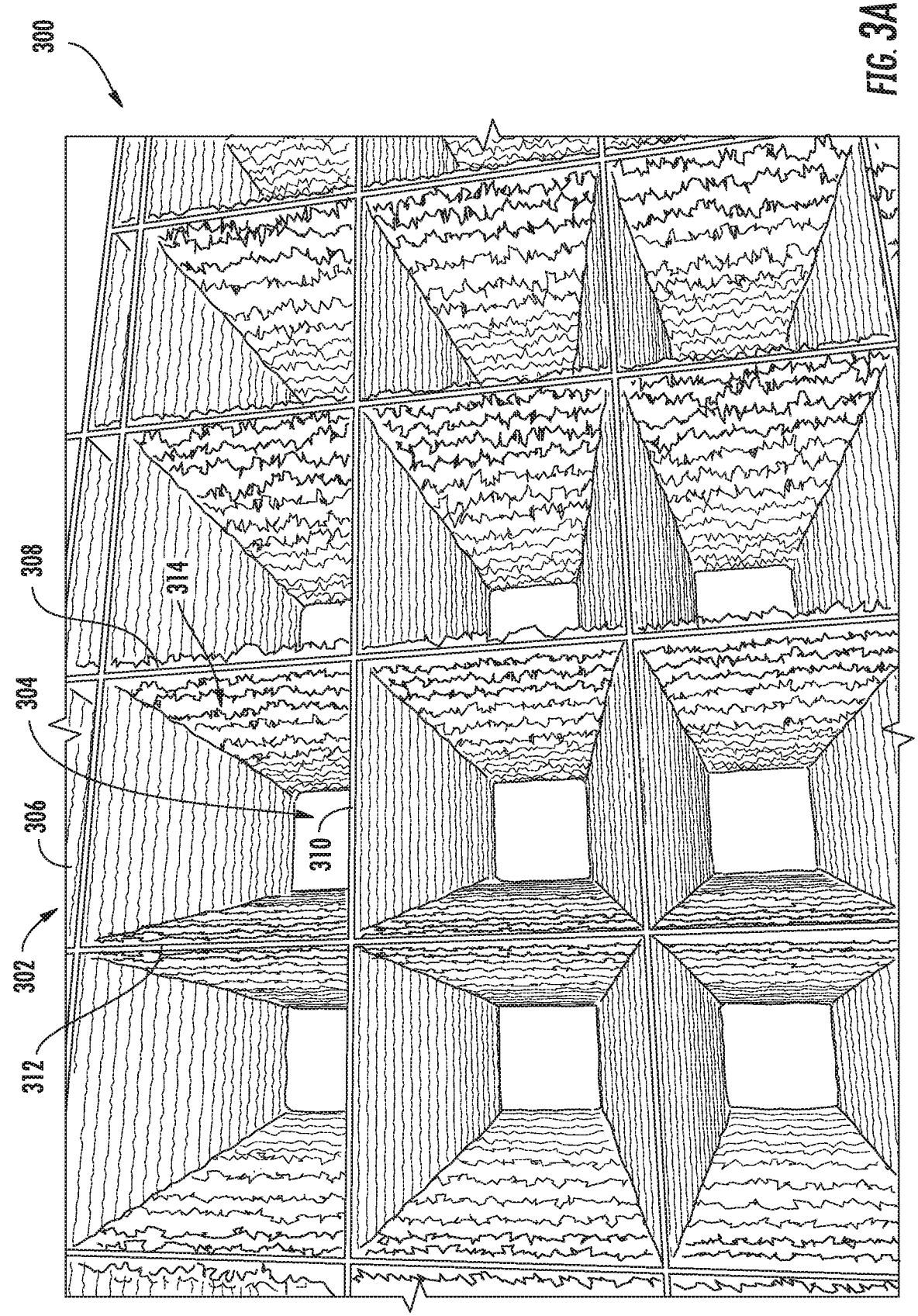
FIGS. 3A and 3B show an exemplary acoustic core that has sound-attenuating protuberances.
Figure 3B:
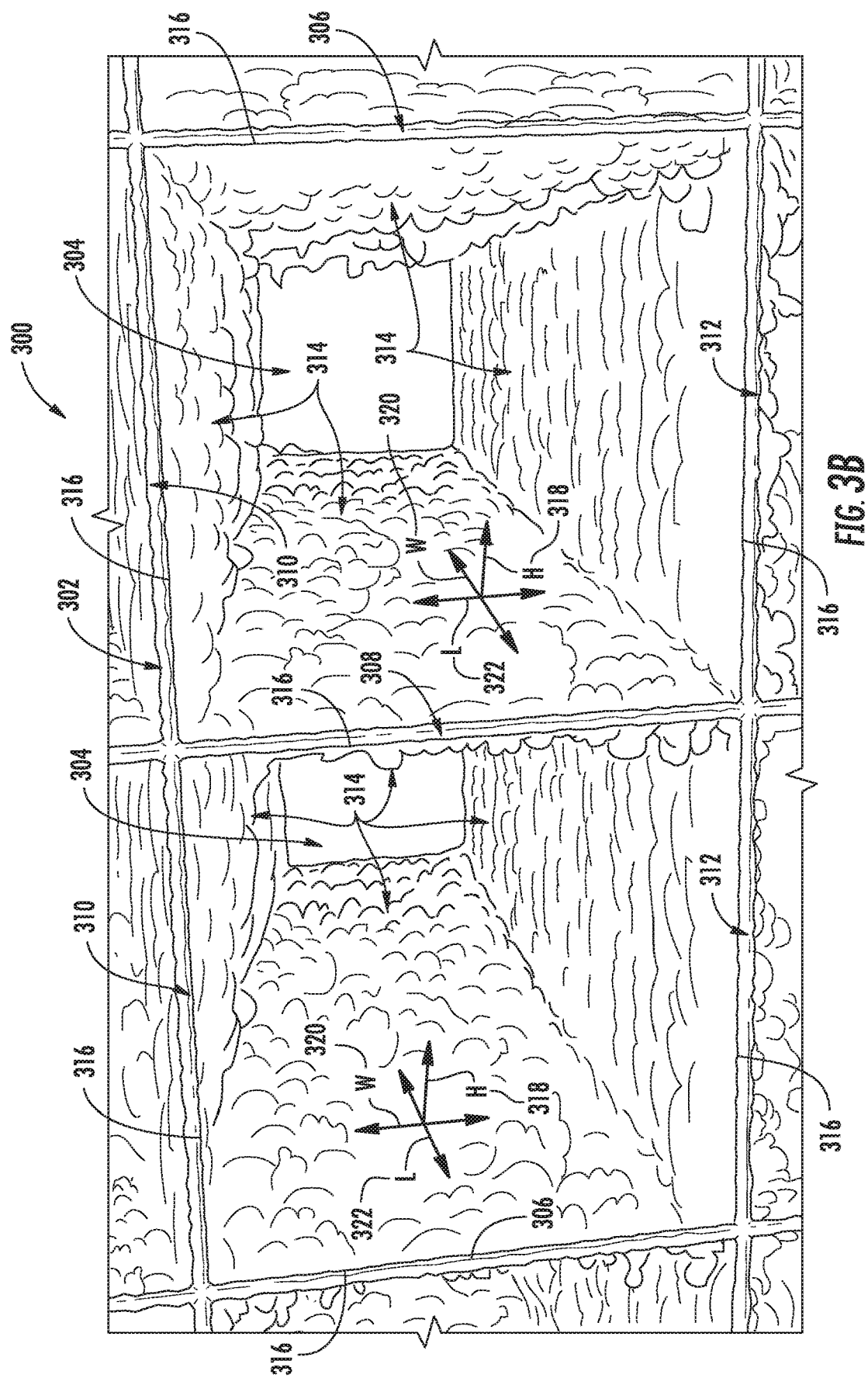

Now referring to FIGS. 3A and 3B, exemplary acoustic cores that include sound-attenuating protuberances will be described in greater detail. An exemplary acoustic core 300 is shown in FIG. 3A. The acoustic core 300 includes an array of resonant cells 302. FIG. 5B shows an enlarged view of two resonant cells 302 from the acoustic core 300 of FIG. 3A. Each of the resonant cells 302 have a plurality of cell walls formed of an additive-manufacturing material, and a resonant space 304 defined by the plurality of cell walls. As shown, the array of resonant cells 302 includes resonant cells that have four cell walls. That is, an exemplary resonant cell may have a first cell wall 306, a second cell wall 308, a third cell wall 310, and a fourth cell wall 312, and those four cell walls together define the perimeter of a resonant space 304. However, it will be appreciated that resonant cells 302 may be provided with any desired number of cell walls, and the example shown is not intended to be taken in a limiting sense.

The resonant cells 302 include a multitude of sound-attenuating protuberances 314 protruding into the resonant space 304 from a nominal surface 316 of the cell walls. As shown, the resonant cells 302 have sound-attenuating protuberances 314 across the entirety of the cell walls. However, to realize a benefit to sound attenuation, the sound-attenuating protuberances 314 need not necessarily be provided across the entirety of the cell walls, nor across every cell wall, nor on every resonant cell of an array. In fact, in some embodiments improved sound attenuation may be realized by providing sound-attenuating protuberances 314 across only a particular area of a cell wall, across only a portion of the cell walls, and across only a portion of an array. Likewise, a corresponding remainder of a cell wall, portion of cell walls, or portion of an array of resonant cells 302 may have no sound-attenuating protuberances at all. Thus, in accordance with the present disclosure, At least some of the resonant cells 302 have a multitude of sound-attenuating protuberances.

The sound-attenuating protuberances take the form of the additive-manufacturing material of the cell walls integrally protruding into the resonant space 304 with a random or semi-random orientation about at least a portion of the cell walls. Exemplary sound-attenuating protuberances may include any one or more of a combination of protuberant features having a variety of shapes and configurations, including nodules, loops, hooks, bumps, burls, clots, lumps, knobs, projections, protrusions, swells, enlargements, outgrowths, accretions, blisters, juts, and the like. These sound-attenuating protuberances 314 occur in a random or semi-random fashion as a product of the particular manner in which the resonant cells are formed. However, the particular configuration, arrangement, or orientation of the sound-attenuating protuberances 314 may be selectively controlled or modified by adjusting the manner in which the resonant cells are formed.

Regardless of their shape, sound-attenuating protuberances 314 may be provided in any desired size. The sound-attenuating protuberances 314 protrude from the nominal surface 316 of a cell wall in respect of a height (h) 318, a width (w) 320, and a length (l) 322. In some embodiments, a multitude of sound-attenuating protuberances 314 may have an average height, width, and/or length of from about 5 to 10,000 micrometers. The size of the sound-attenuating protuberances 314 may be selected based on the desired sound-attenuation properties of the resonant cells 302.

A multitude of sound-attenuating protuberances 314 may have an average height, (h) 318 of from about 5 to 10,000 micrometers, as measured from the nominal surface of the cell wall from which the sound-attenuating protuberances 314 protrude. For example, the average height 318 of the sound-attenuating protuberances 314 may be from about 10 µm to 5,000 µm, such as from about 10 µm to 1,000 µm, such as from about 10 µm to 500 µm, such as from about 10 µm to 400 µm, such as from about 25 µm to 300 µm such as from about 50 µm to 200 µm, or such as from about 75 µm to 150 µm. The multitude of sound-attenuating protuberances 314 may have an average height 318 of 10,000 µm or less, such as 5,000 µm or less, such as 1,000 µm or less, such as 500 µm or less, such as 400 µm or less, such as 300 µm or less, such as 200 µm or less, such as 100 µm or less, such as 75 µm or less, such as 50 µm or less, such as 25 µm or less, or such as 10 µm or less. The multitude of sound-attenuating protuberances 314 may have an average height 318 of 10 µm or more, such as 25 µm more, such as 50 µm more, such as 75 µm more, such as 100 µm more, such as 150 µm more, such as 200 µm more, such as 300 µm more, such as 400 µm more, such as 500 µm more, such as 1,000 µm more, or such as 5,000 µm more.

A multitude of sound-attenuating protuberances 314 may have an average width, (w) 320 of from 5 to 500 micrometers, as measured laterally across the surface of the cell wall from which the sound-attenuating protuberances 314 protrude. For example, the average width 320 of the sound-attenuating protuberances 314 may be from 10 µm to 5,000 µm, such as from 10 µm to 1,000 µm, such as from 10 µm to 500 µm, such as from 10 µm to 400 µm, such as from 25 µm to 300 µm such as from 50 µm to 200 µm, such as from 75 µm to 150 µm. The multitude of sound-attenuating protuberances 314 may have an average width 320 of 10,000 µm or less, such as 5,000 µm or less, such as 1,000 µm or less, such as 500 µm or less, such as 400 µm or less, such as 300 µm or less, such as 200 µm or less, such as 100 µm or less, such as 75 µm or less, such as 50 µm or less, such as 25 µm or less, or such as 10 µm or less. The multitude of sound-attenuating protuberances 314 may also have an average width 320 of 10 µm or more, such as 25 µm more, such as 50 µm more, such as 75 µm more, such as 100 µm more, such as 150 µm more, such as 200 µm more, such as 300 µm more, such as 400 µm more, such as 500 µm more, such as 1,000 µm more, or such as 5,000 µm more.

A multitude of sound-attenuating protuberances 314 may have an average length, (l) 322 of from 5 to 500 micrometers, as measured longitudinally along the surface of the cell wall from which the sound-attenuating protuberances 314 protrude. For example, the average length 322 of the sound-attenuating protuberances may be from 10 urn to 5,000 µm, such as from 10 urn to 1,000 µm, such as from 10 urn to 500 µm, such as from 10 µm to 400 µm, such as from 25 µm to 300 µm such as from 50 µm to 200 µm, or such as from 75 µm to 150 µm. The multitude of sound-attenuating protuberances 314 may have an average length 322 of 10,000 µm or less, such as 5,000 µm or less, such as 1,000 µm or less, such as 500 µm or less, such as 400 µm or less, such as 300 µm or less, such as 200 µm or less, such as 100 µm or less, such as 75 µm or less, such as 50 µm or less, such as 25 µm or less, or such as 10 µm or less. The multitude of sound-attenuating protuberances 314 may have an average length 322 of 10 µm or more, such as 25 µm more, such as 50 µm more, such as 75 µm more, such as 100 µm more, such as 150 µm more, such as 200 µm more, such as 300 µm more, such as 400 µm more, such as 500 µm more, such as 1,000 µm more, or such as 5,000 µm more.

Now referring to FIGS. 4A and 4B, an exemplary embodiment of intentionally incidental formation of sound-attenuating protuberances will be described. An additive-manufacturing technology may be configured to orient an additive-manufacturing tool with respect to a toolpath 400. Typically the toolpath 400 follows a contour that occupies a two-dimensional space, however a toolpath may alternatively be orientated with respect to a contour that occupies a three-dimensional space. In either case, a workpart such as an acoustic core 300 may be formed in sequential contours applied one on top of another, separated by a contour interval. Each sequential contour may be formed by orienting the additive-manufacturing tool with respect to a toolpath, such that the workpart is formed by additive manufacturing material bonding or otherwise being solidified in a domain 401 occupied by the respective contours. The domain 401 corresponding to a respective contour includes a three dimensional volume defined by the contour interval, the space occupied by the contour. It will be appreciated that any workpart may be formed in the manner described herein so as to integrally form sound-attenuating protuberances on at least a portion of the workpart. In that regard, the acoustic cores 300 described herein are provided by way of example only and not in a limiting sense. In fact, it may be desirable to provide sound-attenuating protuberances on a wide variety of different workparts, any and all of which are within the spirit and scope of the present disclosure.

As shown in FIG. 4A, an additive-manufacturing tool is oriented with respect to a toolpath 400 that includes a plurality of toolpath passes. For example, the toolpath 400 may include a first toolpath pass 402 and a second toolpath pass 404, which may each represent a portion of the toolpath 400. The plurality of toolpath passes (e.g., the first toolpath pass 402 and the second toolpath pass 404) overlap one another at a toolpath overlap zone 406. In some embodiments, sound-attenuating protuberances may be formed by the introduction of additional additive-manufacturing material to the workpart. The additional additive-manufacturing material may be introduced to the workpart within the toolpath overlap zone 406. Additionally, or in the alternative, additional additive-manufacturing material may be introduced at a location outside of the toolpath overlap zone 406, such as a region of the workpart adjacent to the toolpath overlap zone.

Regardless of where the additional additive-manufacturing material is introduced, as shown in FIG. 4B, the overlapping toolpath passes cause a portion of the additive-manufacturing material to be introduced to the workpart (e.g., the acoustic core 300) in the form of incidental protuberances protruding from the wall of the workpart (e.g., the acoustic core 300). These protuberances have sound-attenuating properties, and as such, are referred to herein as sound-attenuating protuberances 314. The incidental nature with which the sound-attenuating protuberances are formed gives the sound-attenuating protuberances a random or semi-random orientation. The size, shape, and/or configuration of the sound-attenuating protuberances and/or the existence thereof may depend at least in part on the extent of overlap as between the plurality of toolpath passes in the toolpath overlap zone 406.

The extent of the overlap as between two toolpath passes (e.g., the first toolpath pass 402 and the second toolpath pass 404) in the toolpath overlap zone 406 may be described with reference to a toolpath gap 408, which describes a distance between a first pass centerline 410 and a second pass centerline 412. The toolpath gap 408 may be described in relation to a toolpath pass width 414 and/or a contour width 416. A toolpath pass width 414 refers to the average width of a toolpath pass, such as the first toolpath pass 402, without regard to the presence of sound-attenuating protuberances. A contour width 416 refers to the average width of a plurality of toolpath passes defining the toolpath overlap zone 406, such as that of the first toolpath pass 402 and the second toolpath pass 404, without regard to the presence of sound-attenuating protuberances. In some embodiments, the amount of additional additive-manufacturing material introduced to the workpart may be proportional to the toolpath gap 408.

The integral formation of the sound-attenuating protuberances may depend on providing a toolpath gap 408 of sufficient size so as to introduce to the workpart sufficient additional additive-manufacturing material. The size of the toolpath gap 408 may be described with reference to a toolpath gap ratio, which refers to a ratio of the contour width 416 to the toolpath pass width 414. In some embodiments, the amount of sound additional additive-manufacturing material introduced may be depend at least in part on the toolpath gap ratio. The particular toolpath gap ratio that may be suitable for a given workpart may be selected by evaluating the sound-attenuation properties of the sound-attenuating protuberances resulting therefrom.

A toolpath gap ratio may range from 1.0 to less than 2.0. A toolpath gap ratio of 1.0 corresponds to fully overlapping toolpath passes. A toolpath gap ratio of 2.0 corresponds to adjacent and abutting toolpath passes that do not overlap. In some embodiments, sound-attenuating protuberances 314 may be integrally formed by providing a toolpath gap ratio from 1.0 to less than 2.0, such as from 1.1 to 1.9, such as from 1.1 to 1.8, such as from 1.1. to 1.5, such as from 1.1 to 1.3, such as from 1.2 to 1.7, such as from 1.5 to 1.9, such as from 1.5 to 1.7. The toolpath gap ratio may be 1.0 or more, such as 1.1 or more, such as 1.2 or more, such as 1.3 or more, such as 1.4 or more, such as 1.5 or more, such as 1.6 or more, such as 1.7 or more, such as 1.8 or more, or such as 1.9 or more. The toolpath gap ratio may be less than 2.0, such as less than 1.9, such as less than 1.8 such as less than 1.7, such as less than 1.6, such as less than 1.5, such as less than 1.4, such as less than 1.3, such as less than 1.2, or such as less than 1.1.

Sequential contours of a workpart such as an acoustic core 300 may be formed by orienting the additive-manufacturing tool with respect to sequential toolpaths 400. The sequential contours may be applied on top of one another, incrementing in a stepwise manner to additively build the workpart. All or a portion of the sequential toolpaths 400 may include overlapping toolpath passes providing for a toolpath overlap zone 406. However, it is not necessary that every toolpath 400 provide for a toolpath overlap zone 406, and it also is not necessary that a toolpath overlap zone 406 exist with respect to the entirety of a toolpath 400. In fact, the toolpath overlap zone 406 may be present in an intermittent or variable manner. Additionally, or in the alternative, additional additive-manufacturing material may be introduced within the toolpath overlap zone 406 in an intermittent or variable manner. As examples, an additive-manufacturing tool may follow a variable or irregular toolpath 400 or toolpath passes such that the toolpath overlap zone 406 exhibits a variable or irregular nature. As further examples an additive-manufacturing tool may cause the introduction of additive-manufacturing material to occur in a variable or irregular manner, such as by cycling a tool speed or material introduction rate.

The specific nature in which sound-attenuating protuberances are integrally formed in an intentionally incidental manner may depend on the particular additive-manufacturing technology used. Additive-manufacturing technologies may be grouped by the nature of the input from the additive-manufacturing tool. For example, an additive-manufacturing tool may introduce an additive-manufacturing material and/or a beam of additive energy to additively manufacture a workpart. The additive-manufacturing material may be an amorphous material such as a powder, a liquid, a gel, a polymer, etc. The additive-manufacturing technology includes conforming the amorphous material to a solid workpart through a process such as melting, fusing, curing, etc.

Additive-manufacturing technologies which utilize an additive-manufacturing tool that introduces an additive-manufacturing material are sometimes referred to herein as additive material technologies. Additive material technologies includes material extrusion (e.g., fused deposition modeling (FDM), fused filament fabrication (FFF), etc.), material jetting (MJ) (e.g., smooth curvatures printing (SCP), multi jet modeling (MJM), etc.), binder jetting (BJ), and directed energy deposition (DED) (e.g., laser metal deposition (LMD), laser engineered net shaping (LENS), directed metal deposition (DMD), etc.).

In the case of material extrusion, the additive-manufacturing material may be provided in the form of a filament. The filament may include a thermoplastic material or a ceramic material, for example. In the case of material jetting (MJ), the additive-manufacturing material may include a photosensitive material, such as a thermosetting material. The photosensitive material may be supplied in the form of a liquid, gel, or the like, and may solidify when exposed to an additive energy source such as ultraviolet light. In the case of binder jetting (BJ), the additive-manufacturing material may include a binder material which is jetted into a bed of powder material. The binder material may be applied in the form of a liquid, gel, or the like. Exemplary binder materials include thermosetting materials or thermoplastic materials. Exemplary powder material for binder jetting (BJ) may include, for example, metal or metal alloys, thermoplastic materials, and ceramics. In the case of directed energy deposition (DED), the additive-manufacturing material may be provided in the form of a wire, a filament, or powder. Exemplary material for directed energy deposition (DED) may include, for example, metal or metal alloys, thermoplastic materials, and ceramics.

Additive-manufacturing technologies which utilize an additive-manufacturing tool that introduces a beam of additive energy to solidify (e.g., melt, fuse, cure, etc.) an amorphous additive-manufacturing material (e.g., a powder, a liquid, a gel, etc.) are sometimes referred to herein as additive energy technologies. Additive energy technologies include powder bed fusion (PFB) (e.g., selective laser sintering (SLS), direct metal laser sintering (SLM), laser melting (LM), electron beam melting (EBM), selective heat sintering (SHS), multi-let fusion (MJF), etc.), and vat photopolymerization (e.g., stereolithography apparatus (SLA), digital light processing (DLP), scan, spin, and selectively photocure (3SP), continuous liquid interface production (CLIP), etc.). In the case of powder bed fusion (PFB), the additive-manufacturing material may be provided in the form of a powder. Exemplary powder material for powder bed fusion (PFB), may include, for example, metal or metal alloys, thermoplastic materials, and ceramics. In the case of vat photopolymerization, the additive-manufacturing material may include a photosensitive material.

Exemplary thermosetting materials that may be used with additive manufacturing technologies (e.g., additive material technologies or additive energy technologies) include, for example, epoxies, resins, acrylics, phenolics, polyurethanes, polyimides, bismaleimides, cyanate esters, phenolics, benzoxazines, phthalonitriles. Exemplary thermoplastic materials that may be used with additive manufacturing technologies (e.g., additive material technologies or additive energy technologies) include, for example, acrylonitrile butadiene styrene (ABS), polyphenylsulfone (PPSF), polycarbonate (PC), polylactic acid (PLA), high-impact polystyrene (HIPS), thermoplastic polyurethane (TPU), aliphatic polyamides (nylon), or polyether ether ketone (PEEK), as well as combinations thereof. Exemplary photosensitive materials that may be utilized with additive manufacturing technologies (e.g., additive material technologies or additive energy technologies) include a formulation containing, for example, a binder, a monomer, and a photoinitiator. Exemplary binders include styrenes, methacrylates, vinyl alcohols, olefins, clycerols, and propylenes. Exemplary monomers include acrylic acids, methacrylic acids, isodecyl acrylates, and N-vinyl pyrrolidone. Exemplary photoinitiators include free radical photoinitiateors such as isopropylthioxanthone, benzophenone, and 2,2-azobizisobutyronitrile, and cationic photoinitators such as diaryliodonium salts and triarylsulfonium salts.

In some embodiments, sound-attenuating protuberances may be integrally formed in an intentionally incidental manner using an additive material technology. One suitable additive material technology includes fused deposition modeling (FDM) or fused filament fabrication (FFF), however other additive material technologies also may be used. With an additive material technology, the additive-manufacturing tool introduces an additive-manufacturing material to the workpart. The overlapping toolpath passes cause an excess of additive-manufacturing material to be introduced into a domain 401 occupied by the contour defined by the toolpath 400. As additional contours are applied to the workpart, adjacent contours force excess additive-manufacturing material outward from the respective contours, causing incidental protuberances of additional additive-manufacturing material to be intentionally formed with a random or semi-random orientation. For example, with fused deposition modeling (FDM) or fused filament fabrication (FFF), excess material is extruded and deposited in the overlapping toolpath passes, causing an accumulation of excess material in the toolpath overlap zone 406, forcing extruded material outward from the respective contours. The additive-manufacturing material making up the protuberances may come from any portion of the additive-manufacturing material, including any one or more toolpaths 400 and/or any one or more toolpath passes 402, 404, and including material originating from within or outside of the toolpath overlap zone 406. In some embodiments, at least a portion of the sound-attenuating protuberances may have one or more dimensions that are smaller than a corresponding minimum dimensional resolution provided for by the additive-manufacturing technology used to produce the workpart. For additive material technologies, the dimensional resolution may be defined by the dimensions of the material introduced. For example, with fused deposition modeling (FDM) or fused filament fabrication (FFF), the dimensional resolution may be defined by the cross-sectional dimension of filaments as extruded during the fused deposition modeling process.

In some embodiments, sound-attenuating protuberances may be integrally formed in an intentionally incidental manner using an additive energy technology. One suitable additive energy technology includes selective laser sintering (SLS), however, other additive energy technologies also may be used. With an additive energy technology, the additive-manufacturing tool introduces a beam of additive energy to the workpart, which solidifies an amorphous additive-manufacturing material. The overlapping toolpath passes causes excess of additive energy to be introduced into a domain 401 occupied by the contour defined by the toolpath 400. This excess energy propagates outward from the respective contours, causing incidental protuberances of additional additive-manufacturing material to be intentionally formed with a random or semi-random orientation. For example, with selective laser sintering (SLS), heat generated by a laser melts a powder material. To form sound-attenuating protuberances, excess laser energy is intentionally introduced by providing overlapping toolpath passes, and this excess laser energy incidentally melts adjacent powder particles outside of the domain 401 occupied by the respective contours with a random or semi-random orientation. In some embodiments, at least a portion of the sound-attenuating protuberances may have one or more dimensions that are smaller than a corresponding minimum dimensional resolution provided for by the additive-manufacturing technology used to produce the workpart. For additive energy technologies, the dimensional resolution may be defined by the cross-sectional dimensions of the amorphous additive-manufacturing material and/or the cross-sectional dimensions of the beam of additive energy. For example, with selective laser sintering (SLS), the dimensional resolution may be defined by the cross-sectional dimension of the particles of the amorphous additive-manufacturing material and/or the cross-sectional dimension of the laser beam used to melt the particles. As another example, for vat photopolymerization, the dimensional resolution may be defined by the cross-sectional dimension of a laser or other energy beam used to cure the photopolymer.

In some embodiments, sound-attenuating protuberances may be integrally formed using a combination of additive material technology and additive energy technology. For example, it will be appreciated that directed energy deposition (DED) utilizes an additive-manufacturing tool that introduces both an additive-manufacturing material and an additive energy. Additionally, or in the alternative, different additive-manufacturing technologies may be combined with one another, such as by using different additive-manufacturing technologies for different portions of a workpart, and/or by using different additive-manufacturing technologies simultaneously, sequentially, or otherwise in combination, to integrally form sound-attenuating protuberances in a workpart such as an acoustic core 300.

Figure 5:
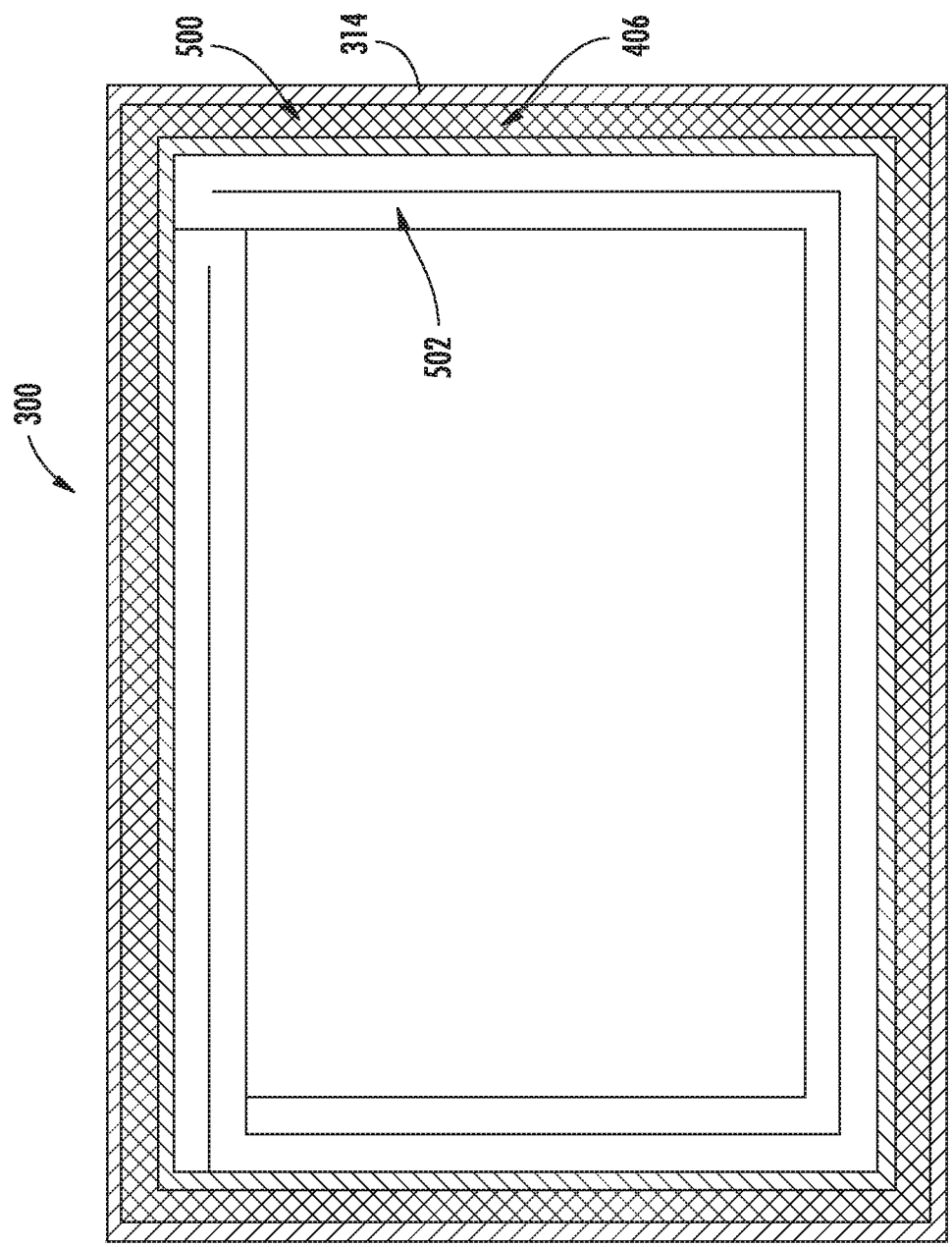
FIG. 5 illustratively shows an exemplary external contour with overlapping toolpath passes intended to form sound-attenuating protuberances, and internal contours adjacent to the external contour.

Now referring to FIG. 5, it will be appreciated that every toolpath or toolpath pass need not overlap to form sound-attenuating protuberances. For example, as shown in FIG. 5, one or more external contours 500 that define cell walls may include overlapping toolpath passes so as to form sound-attenuating protuberances 314 (FIGS. 3A and 3B) on the cell walls, while one or more internal contours 502 that define internal structure may not necessarily have overlapping toolpath passes. However, it will be appreciated that some nominal overlap may be provided, such as for the purpose of sufficiently bonding domains 401 of additive-manufacturing material corresponding to adjacent toolpaths. Yet, such nominal overlap typically would not form sound-attenuating protuberances as described herein apart from providing a sufficient toolpath gap ratio.

Acoustic cores may be additively manufactured from any one or more materials known in the art, including synthetic fibers, metal alloys, composite materials, and combinations thereof. Exemplary synthetic fibers include extruded polymer filaments such as polyetherimide, polycarbonate, acrylonitrile, acrylonitrile-butadiene-styrene, aramid fiber, meta-aramid fiber, para-aramid fiber, polyethylene fiber, rayon, polyester, and nylon. Exemplary metal alloys include aluminum alloys, steel alloys, titanium alloys, and nickel alloys (e.g., superalloys, such as austenitic nickel-chromium-based superalloys). Exemplary composite materials include ceramic matrix composite (CMC) materials, which may include composite matrix materials such as silicon carbide, silicon, silica, alumina, and/or combinations thereof. Ceramic fibers may be embedded within the matrix, such as oxidation stable reinforcing fibers including monofilaments like sapphire and silicon carbide, yarn including silicon carbide, alumina silicates, and chopped whiskers and fibers, and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth. Additionally, acoustic cores may be formed from any other suitable materials known in the art, all of which are within the spirit and scope of the present disclosure.

Figure 6:
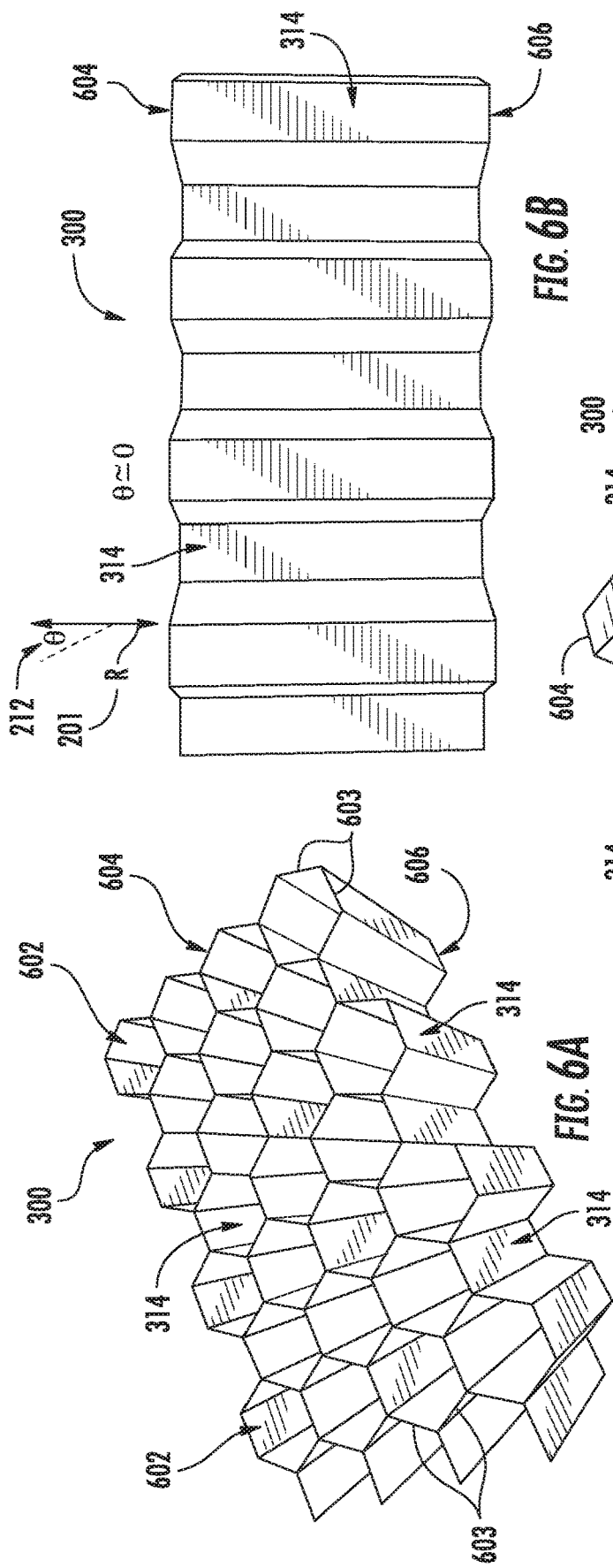
FIGS. 6A-6C respectively show a top perspective view, a side view, and a bottom perspective view of an acoustic core that has a parallel polyhedral cellular structure.

The presently disclosed acoustic cores may include resonant cells with any polyhedral configuration, including parallel polyhedral cellular structures and/or oblique polyhedral cellular structures. Parallel polyhedral cellular structures generally have geometric characteristics reflecting a right prism or a substantially right prism. A right prism is a polyhedron composed of an n-sided polygonal top face, a bottom face which is a translated copy of the top face without rotation, and n-number of rectangular lateral faces bisected by the top face and the bottom face. Given these characteristics of a right prism or substantially right prism, parallel polyhedral cellular structures have lateral faces that are substantially parallel to a normal line 201 represented by an axis R. For example, FIGS. 6A-6C show an acoustic core 300 that has a parallel polyhedral cellular structure. As shown in FIGS. 6A-6C, the acoustic core 300 has a plurality of polyhedral resonant cells 602 that exhibit geometric characteristics of a hexagonal prism or a "honeycomb" structure. The polyhedral resonant cells 602 have a plurality of lateral polygonal faces 603 bisected by a top face 604 and a bottom face 606. The top face 604 and the bottom face 606 are substantially parallel to one another and have substantially the same surface area as one another. The lateral faces 603 are substantially parallel to the normal line 201 and have a convergence angle θ (theta) 212 of zero or approximately zero. Parallel polyhedral cellular structures, however, are not limited to those structures with identically sized lateral rectangular faces, nor are parallel polyhedral cellular structures limited to those structures with identical internal angles between adjacent lateral rectangular faces. Rather, parallel cellular structures include those structures with differently sized lateral rectangular faces and correspondingly differing internal angles between adjacent lateral rectangular faces. Such parallel cellular structures nevertheless have a top face 604 and a bottom face 606 with substantially the same surface area. Also, it will be appreciated that parallel cellular structures may not exhibit perfect symmetry due to minor imprecision in manufacturing technology and the like leading to imperfect symmetry in the cellular structures.

In contrast with parallel cellular structures, oblique polyhedral cellular structures have polyhedral cells with least one lateral face that either converges or diverges relative to the normal line 201 represented by the axis R at a convergence angle θ (theta) 212 greater than zero degrees. A wide variety of convergence angles and/or divergence angles may be provided. For example, in various embodiments, a convergence angle θ (theta) 212 may fall within a range from greater than zero to 45 degrees, such as from 1 to 10 degrees, such as from 1 to 20 degrees, such as from 1 to 30 degrees, or such as from 1 to 45 degrees. In some embodiments, a convergence angle θ (theta) 212 may fall within a range from 2 to 30 degrees, such as from 2 to 10 degrees, such as from 5 to 15 degrees, such as from 10 to 20 degrees, or such as from 15 to 30 degrees. The convergence angle θ (theta) 212 may be greater than zero degrees, such as greater than 1 degrees, such as greater than 2 degrees, such as greater than 5 degrees, such as greater than 10 degrees, such as greater than 15 degrees, such as greater than 20 degrees, such as greater than 25 degrees, such as greater than 30 degrees, such as greater than 35 degrees, or such as greater than 40 degrees. The convergence angle θ (theta) 212 may be less than 45 degrees, such as less than 40 degrees, such as less than 35 degrees, such as less than 30 degrees, such as less than 25 degrees, such as less than 20 degrees, such as less than 15 degrees, such as less than 10 degrees, such as less than 5 degrees, or such as less than 1 degrees.

Figure 7:
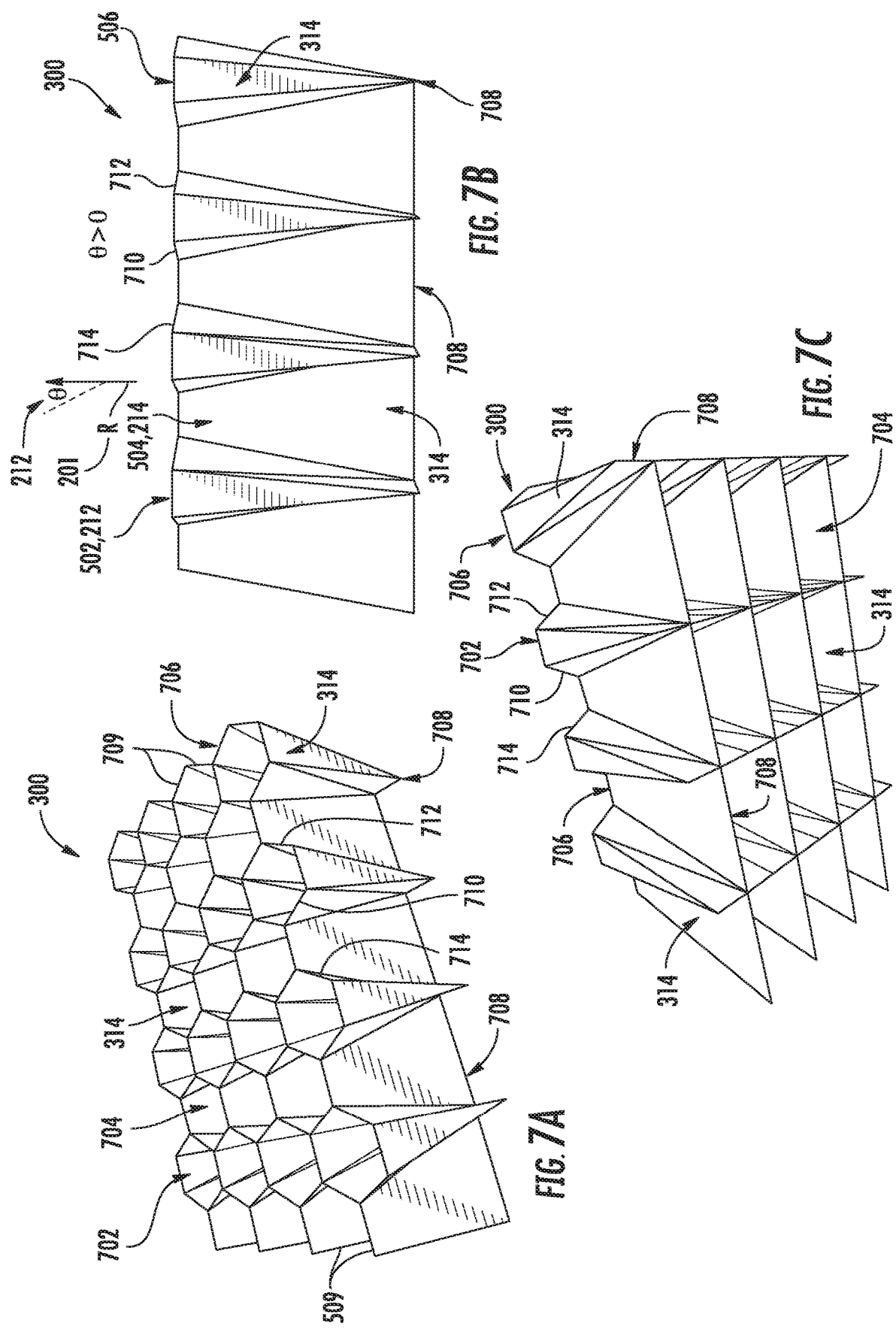
FIGS. 7A-7C respectively show a top perspective view, a side view, and a bottom perspective view of an acoustic core that has a oblique polyhedral cellular structure.

The exemplary acoustic core shown in FIGS. 5A and 5B gives one example of an oblique polyhedral cellular structure. FIGS. 7A-7C show another exemplary oblique polyhedral cellular structure 700. An oblique polyhedral cellular structure 700 includes a plurality of converging polyhedral cells 702, and a plurality of diverging polyhedral cells 704, bisected by a top face 706 and a bottom face 708. As shown, the top face 706 and the bottom face 708 are substantially parallel to one another. Each of the converging polyhedral cells 702 or diverging polyhedral cells 704 have a plurality of lateral polygonal faces 709. These lateral polygonal faces include at least a first lateral face 710 that converges relative to the normal line 201 represented by the axis R at a convergence angle θ (theta) 212 greater than zero degrees. Additionally, or in the alternative, the lateral polygonal faces include at least a first lateral face 710 that converges and/or relative to at least a second lateral face 712. In some embodiments, the first lateral face 710 may additionally or alternatively diverge relative to the normal line 201 and/or relative to at least a third lateral face 714.

The converging polyhedral cells 702 and/or diverging polyhedral cells 704 have asymmetry in respect of at least one such converging or diverging lateral face and/or in respect of a differing cross-sectional area as between two substantially parallel planes that bisect the cell (i.e., the top face 706 and the bottom face 708). The substantially parallel planes 706, 708 may bisect an oblique polyhedral cell as a plane, as a line, or as a point, depending on the configuration of the particular cell. As a convenience, such a plane, line, or point may sometimes be referred to more generally as a face. For example, the top face 706 bisects both the converging cells 702 and the diverging cells 704 as a plane, and the bottom face 708 bisects the converging cells 702 as a line and the diverging cells 704 as a plane.

Figure 8:
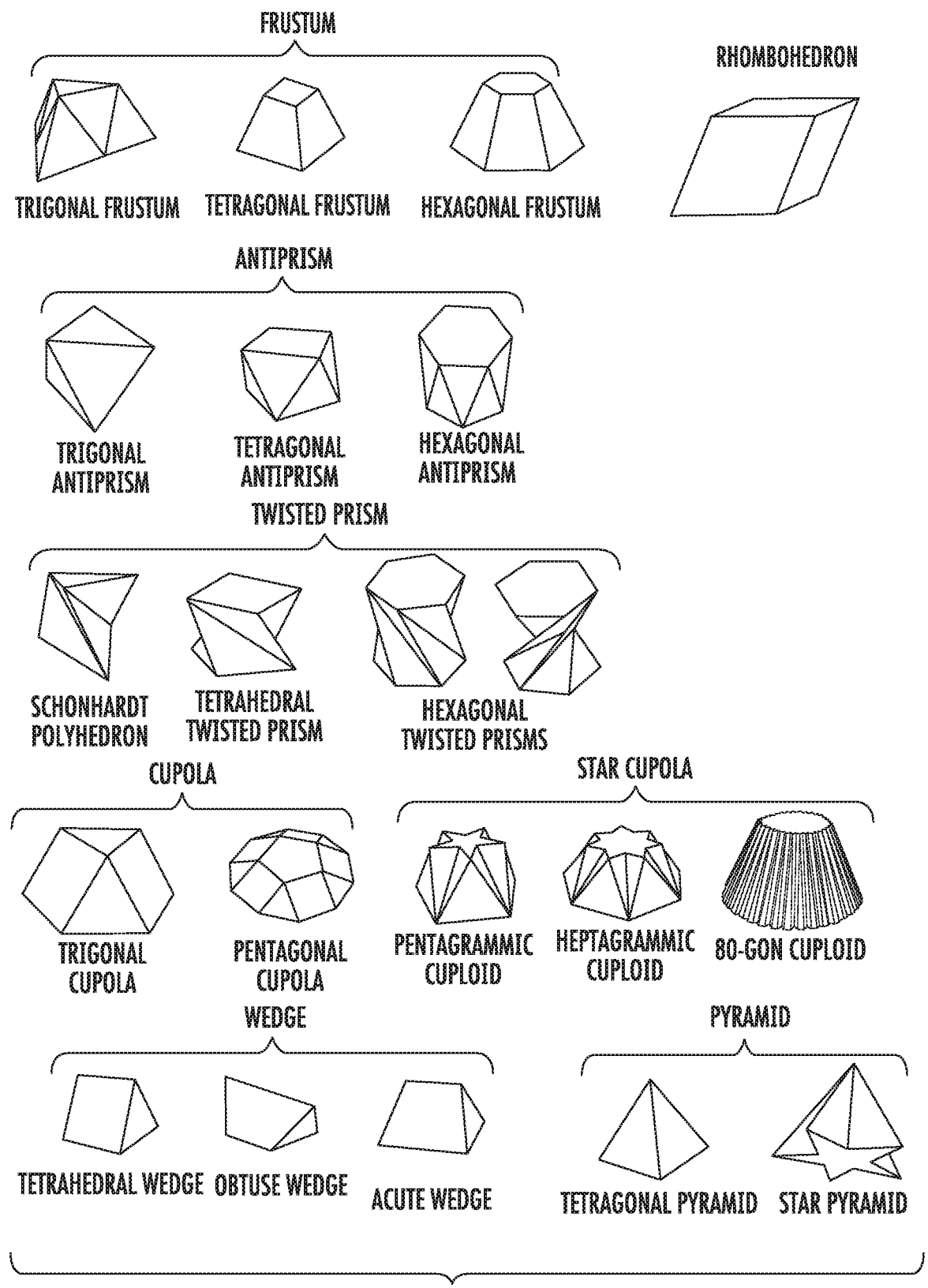
FIG. 8 shows several additional exemplary oblique polyhedral cells that may be included in an acoustic core.

In addition to the exemplary oblique polyhedral cellular structures shown in FIGS. 3A and 3B, and 7A-7C, an acoustic core may include numerous other oblique polyhedral cellular structures. For example, FIG. 8 shows numerous exemplary oblique polyhedron that may be incorporated into an oblique polyhedral cellular structure in accordance with the present disclosure. Oblique polyhedral cellular structures may include all or a portion of any one or more of the oblique polyhedron shown in FIG. 8. Exemplary oblique polyhedral cellular structures may include a frustum, a rhombohedron, an antiprism, a twisted prism, a cupola (including a star cupola), a wedge, a pyramid, and combinations or portions of these. By way of example, a frustum may include a trigonal frustum, a tetragonal frustum, a pentagonal frustum, a hexagonal frustum, a heptagonal frustum, an octagonal frustum, a nonagonal frustum, a decagonal frustum, a hendecagonal frustum, a dodecagonal frustum, any other frustal polyhedron, and combinations of these. A frustal polyhedron includes a frustum combined with another polyhedron, including any of the aforementioned frustum shapes combined with another polyhedron. For example, a rhombohedron may be formed from any rhombus, providing a rhombal polyhedron. As a further example, a rhombohedron may be combined with a frustum to form a rhombohedral frustum.

An antiprism includes a polyhedron composed of a polygonal top face, a polygonal bottom face, and a sequence of adjacent trigonal lateral faces with alternating orientations, bisected by the top face and the bottom face. By way of example, an antiprism may include a trigonal antiprism, a tetragonal antiprism, a hexagonal antiprism, an antiprismal polyhedron, and combinations of these. An antiprismal polyhedron includes an antiprism combined with another polyhedron. In some embodiments, an antiprism may include an n-sided top face and an n-sided bottom face. Alternatively, an antiprism may include an n-sided top face and a bottom face with greater than or less than n-sided.

A twisted prism includes a polyhedron composed of a polygonal top face, a polygonal bottom face, and a plurality of lateral faces including at least some lateral faces bisected on a diagonal, with the top face and the bottom face twisted relative to one another, causing at least some adjacent lateral faces to be concave relative to one another. By way of example, a twisted prism may include a Schonhardt polyhedron, a tetrahedral twisted prism, a hexagonal twisted prism, a twisted prismal polyhedron, and combinations of these. A twisted prism has one or more lateral faces bisected on an adjacent diagonal or on a subsequent diagonal. For example, FIG. 8 shows a hexagonal twisted prism with lateral faces bisected on an adjacent diagonal, and a hexagonal twisted prism with lateral faces bisected on a second diagonal. A twisted prismal polyhedron includes a twisted prism combined with another polyhedron.

A cupola includes a polyhedron composed of a polygonal top face, a polygonal bottom face, and a plurality of lateral faces including an alternating sequence of trigonal lateral faces and tetragonal lateral faces. In some embodiments, a cupola has a top face with twice as many edges as that of its bottom face, or vice versa. By way of example, a cupola includes a trigonal cupola, which has a tetragonal top face and a hexagonal bottom face, or a hexagonal top face and a tetragonal bottom face; and a pentagonal cupola, which has a pentagonal top face and a decagonal bottom face, or vice versa. A cupola also includes star cupola, which is a cupola in which tetragonal lateral faces are replaced with adjacent concave trigonal lateral faces. Star cupola include a pentagrammic cupoid and a heptagrammic cupoid. A pentagrammic cupoid has a pentagonal bottom face and a pentagrammic top face, or vice versa. A heptagrammic cupoid has a heptagonal top face and a heptagrammic bottom face, or vice versa. As a further example, a cupola includes cupoidal configurations with numerous lateral faces, including configurations which approach frustoconical as the number of lateral faces increases. For example, a cupola includes an octacontagon, which has eighty lateral faces. A cupola also includes a cupoidal polyhedron, which includes a cupola or cupoid combined with another polyhedron.

A wedge includes a polyhedron with a polygonal top face and a plurality of polygonal lateral faces that converge into a line. By way of example, a wedge may include a tetrahedral wedge, an obtuse wedge, an acute wedge, and a wedged polyhedron, and combinations of these. A tetrahedral wedge has two trigonal lateral faces and two tetragonal lateral faces. The lateral faces are bisected by a tetragonal plane on one side and converge into a line on the other. An obtuse wedge converges into a line that is wider than the opposing tetragonal plane. An acute wedge converges into a line that is narrower than the opposing tetragonal plane. A wedged polyhedron includes a wedge combined with another polyhedron.

A pyramid includes a polyhedron with a polygonal base bisected by a plurality of trigonal lateral faces that converge into a point. By way of example, a pyramid includes a tetragonal pyramid composed of a tetragonal face bisected by four trigonal lateral faces which converge into a point. A pyramid also includes a star pyramid, composed of a star polygonal base and a plurality of trigonal lateral faces that converge into a point. As an example, a star pyramid includes a pentagonal star pyramid.

Any one or more of these oblique polyhedral configurations (including combinations or portions thereof) may be included in various exemplary oblique cellular structures. In one aspect, the converging polyhedral cells 702 shown in FIGS. 7A-7C reflect aspects of an antiprism combined with aspects of a wedge. For example, the converging polyhedral cells 702 include a polygonal (hexagonal) top face 706, and similar to an antiprism, a plurality of trigonal lateral faces bisected by a bottom face 708. Similar to a wedge, the bottom face 708 has the form of a line. In another aspect, the converging polyhedral cells 702 reflect aspects of a "flipped antiprism," that is, an antiprism that has been twisted 180-degrees about its vertical axis. The converging polyhedral cells 702 have been flipped or twisted at their midpoints 703. The diverging polyhedral cells 704 reflect aspects of an antiprism combined with aspects of a frustum and/or a cupola. For example, the diverging polyhedral cells 704 include a polygonal (hexagonal) top face 706, bisected by a plurality of lateral faces, which similar to an antiprism have a plurality of adjacent trigonal lateral faces, but also with an alternating sequence of trigonal lateral faces and tetragonal lateral faces similar to a cupola.

Figure 9:
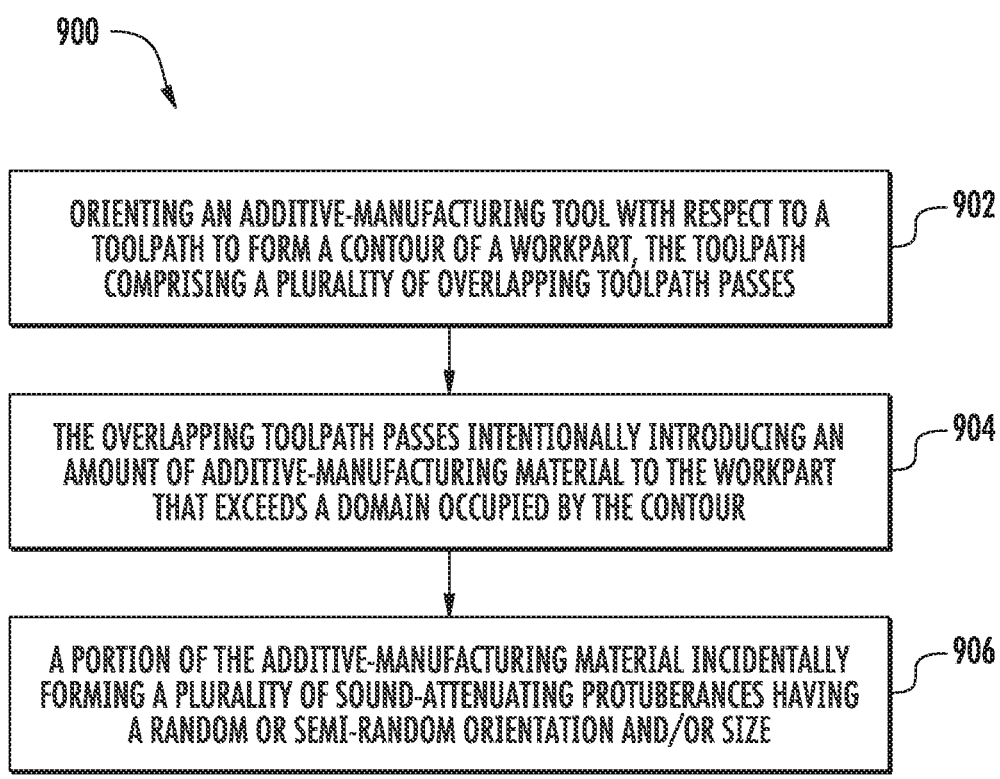
FIG. 9 shows a flowchart illustrating exemplary methods of additively manufacturing a workpart such as an acoustic core with sound-attenuating protuberances.

Now referring to FIG. 9, exemplary methods 900 of forming a workpart that includes an array of resonant cells having sound-attenuating protuberances will be discussed. Exemplary methods 900 include orienting an additive-manufacturing tool with respect to a toolpath to form a contour of a workpart, with the toolpath including a plurality of overlapping toolpath passes 902. The overlapping toolpath passes may be configured so as to intentionally introduce an amount of additive-manufacturing material to the workpart that exceeds a domain 401 occupied by the contour 904. As the amount of additive-manufacturing material intentionally introduced exceeds the domain 401 occupied by the contour, a portion of the additive-manufacturing material may incidentally form a plurality of sound-attenuating protuberances having a random or semi-random orientation and/or size 906. Sequential contours of a workpart may be formed by orienting an additive-manufacturing tool with respect to sequential toolpaths in which at least a portion of the sequential toolpaths include overlapping toolpath passes. The formation of the sound-attenuating protuberances may be intentionally incidental to the formation of the workpart.

In some embodiments, the additive-manufacturing tool may utilize an additive-manufacturing technology that introduces an additive-manufacturing material to form the sequential contours of the workpart. The overlapping toolpath passes may cause an excess of additive-manufacturing material to be introduced into the respective domains 401 occupied by the respective contours corresponding to the overlapping toolpath passes. Adjacent contours may force excess additive-manufacturing material outward to incidentally form the plurality of sound-attenuating protuberances. The additive-manufacturing technology may include material extrusion, material jetting, binder jetting, and/or directed energy deposition. For example, the additive-manufacturing technology may include fused deposition modeling (FDM) or fused filament fabrication (FFF).

In other embodiments, the additive-manufacturing tool may utilize an additive-manufacturing technology that introduces an additive energy to an amorphous additive-manufacturing material. The additive energy may solidify a portion of the amorphous additive-manufacturing material to form the sequential contours of the workpart. The overlapping toolpath passes may cause excess additive energy to be introduced into the respective domains 401 occupied by the respective contours corresponding to the overlapping toolpath passes. Excess additive energy may propagate outward from the respective contours to incidentally form the plurality of sound-attenuating protuberances. The additive-manufacturing technology may include powder bed fusion or vat photopolymerization. For example, the additive-manufacturing technology may include selective laser sintering.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a workpart having sound-attenuating protuberances, the method comprising:
   orienting an additive-manufacturing tool with respect to a toolpath to form a contour of a workpart, the contour comprising a three-dimensional domain containing additive-manufacturing material being introduced to the workpart by the additive-manufacturing tool, the toolpath comprising a plurality of overlapping toolpath passes and the overlapping toolpath passes causing the additive-manufacturing tool to intentionally introduce an amount of additive-manufacturing material to the workpart that exceeds the domain occupied by the contour, a portion of the additive-manufacturing material of the contour and/or of the workpart incidentally forming a plurality of sound-attenuating protuberances having a semi-random orientation and/or size.

2. The method of claim 1, comprising:
   forming sequential contours of the workpart by orienting the additive-manufacturing tool with respect to sequential toolpaths, the sequential contours respectively comprising a respective three-dimensional domain containing additive-manufacturing material being introduced to the workpart by the additive-manufacturing tool, wherein at least a portion of the sequential toolpaths comprise overlapping toolpath passes.

3. The method of claim 2, wherein the additive-manufacturing tool utilizes an additive-manufacturing technology that introduces an additive-manufacturing material to form the sequential contours of the workpart.

4. The method of claim 3, wherein the overlapping toolpath passes cause an excess of additive-manufacturing material to be introduced into the respective three-dimensional domain occupied by the respective sequential contours corresponding to the overlapping toolpath passes.

5. The method of claim 4, wherein the sequential contours comprise adjacent contours, the adjacent contours forcing excess additive-manufacturing material outward to incidentally form the plurality of sound-attenuating protuberances.

6. The method of claim 3, wherein the additive-manufacturing technology utilizes material extrusion, material jetting, binder jetting, or directed energy deposition.

7. The method of claim 6, wherein the additive-manufacturing technology utilizes fused deposition modeling or fused filament fabrication.

8. The method of claim 2, wherein the additive-manufacturing tool utilizes an additive-manufacturing technology that introduces an additive energy to an amorphous additive-manufacturing material, the additive energy solidifying a portion of the amorphous additive-manufacturing material to form the sequential contours of the workpart.

9. The method of claim 8, wherein the overlapping toolpath passes causes excess additive energy to be introduced into the respective domains occupied by the respective contours corresponding to the overlapping toolpath passes, the excess additive energy propagating outward from the respective sequential contours.

10. The method of claim 9, wherein the excess additive energy propagates outward from the respective contours to incidentally form the plurality of sound-attenuating protuberances.

11. The method of claim 8, wherein the additive-manufacturing technology utilizes powder bed fusion or vat photopolymerization.

12. The method of claim 11, wherein the additive-manufacturing technology utilizes selective laser sintering.

13. The method of claim 2, wherein at least a portion of the toolpaths comprise overlapping toolpath passes having a toolpath gap ratio of from 1.0 to less than 2.0.

14. The method of claim 2, wherein the sound-attenuating protuberances have an average height, width, and/or length of from about 5 to 10,000 micrometers.

15. The method of claim 14, wherein at least a portion of the sound-attenuating protuberances have one or more dimensions that are smaller than a corresponding minimum dimensional resolution that the additive-manufacturing technology used to produce the acoustic core is capable of achieving.

* * * * *